(12) United States Patent  
Yuhara

(10) Patent No.: US 7,161,464 B2
(45) Date of Patent: Jan. 9, 2007

(54) VEHICLE SECURITY SYSTEM AND METHOD OF CONTROLLING THE SAME

(75) Inventor: Masahiro Yuhara, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 317 days.

(21) Appl. No.: 10/756,737

(22) Filed: Jan. 13, 2004

(65) Prior Publication Data

US 2004/0145447 A1 Jul. 29, 2004

(30) Foreign Application Priority Data

Jan. 17, 2003 (JP) ............... 2003-009916
Sep. 19, 2003 (JP) ............... 2003-328811

(51) Int. Cl.
*G05B 19/00* (2006.01)
*H04Q 9/00* (2006.01)
*H04Q 5/22* (2006.01)
*H01H 47/22* (2006.01)

(52) U.S. Cl. ............... 340/5.2; 340/5.21; 340/5.1; 340/5.61; 340/5.64; 340/10.2; 340/5.31; 340/426.11; 307/10.2; 307/10.5

(58) Field of Classification Search ............... 340/5.2, 340/5.21, 5.1, 5.61, 5.64, 10.2, 5.31, 426.11, 340/7.1; 307/10.2, 10.5
See application file for complete search history.

(56) References Cited

U.S. PATENT DOCUMENTS

| | | | |
|---|---|---|---|
| 5,479,157 A * | 12/1995 | Suman et al. ............... 340/5.28 |
| 5,519,260 A | 5/1996 | Washington |
| 5,686,765 A * | 11/1997 | Washington ............... 307/10.5 |
| 5,990,785 A * | 11/1999 | Suda ............... 340/426.21 |
| 6,072,402 A | 6/2000 | Wells, III et al. |
| 6,625,540 B1 * | 9/2003 | Kageyama ............... 701/301 |
| 6,873,824 B1 * | 3/2005 | Flick ............... 455/41.2 |
| 2002/0135466 A1 | 9/2002 | Bunyan |

FOREIGN PATENT DOCUMENTS

| | | |
|---|---|---|
| DE | 43 01 039 A | 7/1994 |
| DE | 100 57 423 A | 7/2001 |
| DE | 101 07 166 A | 8/2002 |
| EP | 0 926 023 A | 6/1999 |
| EP | 1 128 335 A | 8/2001 |
| EP | 1 415 873 A | 5/2004 |
| WO | 02/12661 A | 2/2002 |

* cited by examiner

*Primary Examiner*—Jeffery Hofsass
*Assistant Examiner*—Scott Au
(74) *Attorney, Agent, or Firm*—Pearne & Gordon LLP

(57) ABSTRACT

Herein disclosed is a vehicle security system for protecting a vehicle against use by an unauthorized person, comprising: a base station, located away from the vehicle, for transmitting a control signal; and a vehicle unlocking apparatus, provided in the vehicle. The vehicle unlocking apparatus includes: vehicle communication means for receiving the control signal from the base station; and a vehicle component whose operation is necessary to drive the vehicle. The vehicle component is operable to selectively assume two operation states including a vehicle drive state in which the vehicle component allows the vehicle to be used and a vehicle protection state in which the vehicle component protect the vehicle from being used in response to the control signal received by the vehicle communication means.

33 Claims, 10 Drawing Sheets

VEHICLE SECURITY SYSTEM AND METHOD OF CONTROLLING THE SAME

BACKGROUND OF THE INVENTION

1. Field of the Invention

The present invention relates to a vehicle security system and a method of controlling the same, and more particularly to a vehicle security system which can be remotely deactivated and activated.

2. Description of the Related Art

Up until now, there have been provided a wide variety of vehicle security systems for the purpose of protecting a vehicle from a person's unauthorized use. One typical example of the conventional vehicle security systems is shown in FIG. 10. The conventional vehicle security system of this type is disclosed in Japanese Patent Laid-Open Publication No. 2003-120094.

The conventional vehicle security system is shown in FIG. 10 as comprising identification information inputting means 600 for having a user insert his or her electronic key therethrough to input identification information, a storage apparatus 601 for storing therein registered identification information, a control unit 602 for controlling the whole operation of the conventional vehicle security system, a door lock operation unit 603 for locking and unlocking doors, a power control unit 604 for supplying power to electric components in the vehicle, and an engine control unit 605 for controlling the operation of an engine. The control unit 602 is operative to judge whether or not the user is an authorized person by comparing the identification information inputted by the identification information inputting means 600 with the registered identification information stored in the storage apparatus 601, and control, for example, the door lock operation unit 603 to have the door lock operation unit 603 lock the doors in the case that the user is judged to be no authorized person. Furthermore, the control unit 602 may be operative to control the power control unit 604 or the engine control unit 605 to make it impossible for the unauthorized person to drive the vehicle.

As will be seen from the above, here has been described the electronic key for the purpose of simplifying the description and assisting in understanding about the whole operation of the conventional vehicle security system. In reality, the electronic key may be replaced by any other means such as for example a mechanical key, an ID card, or the like as long as it contains the identification information.

The conventional vehicle security system thus constructed as previously mentioned, however, encounters a drawback that the conventional vehicle security system cannot unlock the doors if the user lost the electronic key although the user is the authorized person. This results in the fact that the user is required to call a special person to unlock the door and wait a long time for the door to be unlocked.

Furthermore, the conventional vehicle security system thus constructed encounters another drawback that the conventional vehicle security system makes it possible for the user to drive the vehicle once the user has been judged to be the authorized person regardless of whether or not user's driver license is valid.

SUMMARY OF THE INVENTION

It is, therefore, an object of the present invention to provide a vehicle security system for protecting a vehicle against use by an unauthorized person, which can be remotely deactivated and activated, thereby enabling to promptly unlock the doors of the vehicle even if the user lost the electronic key.

It is another object of the present invention to provide a method of controlling a vehicle security system for protecting a vehicle against use by an unauthorized person, which can be remotely deactivated and activated, thereby enabling to promptly unlock the doors of the vehicle even if the user lost the electronic key.

It is a further object of the present invention to provide a vehicle security system for protecting a vehicle against use by an unauthorized person, which can be remotely deactivated and activated, thereby making is possible to additionally check whether or not user's driver license is valid although the user has been judged to be the authorized person.

It is a still further object of the present invention to provide a method of controlling a vehicle security system for protecting a vehicle against use by an unauthorized person, which can be remotely deactivated and activated, thereby making is possible to additionally check whether or not user's driver license is valid although the user has been judged to be the authorized person.

It is a yet further object of the present invention to provide a vehicle unlocking apparatus for protecting a vehicle against use by an unauthorized person, which can be remotely deactivated and activated, thereby enabling to promptly unlock the doors of the vehicle even if the user lost the electronic key.

It is a yet further object of the present invention to provide a vehicle security control apparatus for protecting a vehicle against use by an unauthorized person, which can be remotely deactivated and activated, thereby making is possible to additionally check whether or not user's driver license is valid although the user has been judged to be the authorized person.

In accordance with a first aspect of the present invention, there is provided a vehicle security system for protecting a vehicle against use by an unauthorized person, comprising: a base station, located away from the vehicle, for transmitting a control signal; and a vehicle unlocking apparatus, provided in the vehicle, including: vehicle communication means for receiving the control signal from the base station; and a vehicle component whose operation is necessary to drive the vehicle, the vehicle component being operable to selectively assume two operation states including a vehicle drive state in which the vehicle component allows the vehicle to be used and a vehicle protection state in which the vehicle component protect the vehicle from being used in response to the control signal received by the vehicle communication means.

In the aforementioned vehicle security system, the vehicle component may be constituted by a lock, the vehicle unlocking apparatus may further include lock control means for controlling the lock to selectively assume the vehicle drive state in which the lock control means unlocks the lock, and the vehicle protection state in which the lock control means locks the lock in response to the control signal received by the vehicle communication means. The base station may be operative to transmit as the control signal an authorization signal and an unlock signal, the vehicle unlocking apparatus may further include: a driving authorization unit for generating a certificate signal authorizing the validity of the base station on the basis of the authorization signal received by the vehicle communication means, the lock control means is operative to assume the vehicle drive state in which the lock control means unlocks the lock in response to the unlock signal only when the certificate signal is generated by the driving authorization unit. The base station may have therein stored information about a plurality of vehicles and a plurality of vehicle users. The base station may be operative to transmit the control signal in response to an unlock request transmitted from the vehicle unlocking apparatus, and the base station may include storage means for accumulatively storing therein information collected upon receiving the unlock request from the vehicle unlocking apparatus and information about the control signal upon transmitting the control signal to the vehicle unlocking apparatus. The vehicle communication means may be operative to communicate with the base station by means of a public telephone line.

In the aforementioned vehicle security system, the vehicle component may be constituted by an engine, and the vehicle unlocking apparatus may be constituted by an engine operation control apparatus for selectively assuming the vehicle drive state in which the engine operation control apparatus enables the operation of the engine, and the vehicle protection state in which the engine operation control apparatus disables the operation of the engine in response to the control signal received by the vehicle communication means.

The vehicle unlocking apparatus may be further constituted by: an electronic driver license having stored therein an identification information element, the electronic driver license capable of being carried; and a vehicle security control apparatus provided in the vehicle, the vehicle security control apparatus including driver license reading out means for reading out the identification information element stored in the electronic driver license; the vehicle communication means may be constituted by an identification information transmitting unit for transmitting the identification information element read out by the driver license reading out means to the base station, the base station may be constituted by a driver license management apparatus having stored therein a plurality of driver information elements respectively corresponding to a plurality of identification information elements, the driver license management apparatus operative to select a driver information element corresponding to the identification information element received from the vehicle security control apparatus from among the driver information elements stored in the driver license management apparatus, and judge whether or not the electronic driver license is valid on the basis of the driver information element corresponding to the identification information element thus selected, and transmit the control signal indicating the result of the judgment, the vehicle security control apparatus may further include: engine operation judging means for judging whether or not the operation of the engine is to be enabled in response to the result of the judgment indicated by the control signal received from the driver license management apparatus, the engine operation judging means may be operative to selectively transmit an enable signal indicating that the operation of the engine is to be enabled and a disable signal indicating that the operation of the engine is to be disabled to an engine operation control apparatus on the basis of a result of the judgment, and the engine operation control apparatus may be operative to assume the vehicle drive state in which the engine operation control apparatus enables the operation of the engine in response to the enable signal and the vehicle protection state in which the engine operation control apparatus disables the operation of the engine in response to the disable signal.

The driver license management apparatus may include: driver information storage means for storing therein a plurality of driver information elements respectively corresponding to a plurality of identification information elements; driver information selecting means for selecting a driver information element corresponding to the identification information element received from the vehicle security control apparatus from among the driver information elements stored in the driver information storage means, validity judging means for judging whether or not the electronic driver license is valid on the basis of the driver information element corresponding to the identification information element thus selected, and control signal transmitting means for transmitting the control signal indicating the result of the judgment made by the validity judging means to the vehicle security control apparatus. Each of the driver information elements may include information about the holder of an electronic driver license, whether or not the electronic driver license has expired, and at least one of a record on a traffic accident, a record on a traffic violation, and a record of payment of a fine.

The driver license management apparatus may further include: message generating means for generating a message to be provided with the holder of the electronic driver license on the basis of the driver information element selected by the driver information selecting means, the control signal transmitting means may be operative to transmit the message generated by the message generating means to the vehicle security control apparatus, and the vehicle security control apparatus may further include message providing means for providing the message transmitted by the control signal transmitting means. The vehicle security control apparatus may further include acknowledgment generating means for generating an acknowledgment signal in response to user's acknowledgment instruction after the message has been provided, and the engine operation judging means may not be operative to transmit an enable signal indicating that the operation of the engine is to be enabled until the acknowledgment signal is received.

The vehicle security control apparatus may further include acknowledgment transmitting means for transmitting the acknowledgment signal generated by the acknowledgment generating means to the driver license management apparatus, the driver license management apparatus may further include expiration date calculating means for calculating an expiration date on the basis of the date when the acknowledgment signal is received, and the expiration date calculating means may be operative to write the expiration date thus calculated into the driver information element stored in the driver information storage means. The control signal transmitting means may be operative to transmit the driver information element selected by the driver information selecting means to the vehicle security control apparatus, the vehicle security control apparatus may include driver information writing means for writing the driver information element transmitted by the control signal transmitting means into the electronic driver license to have the electronic driver license store therein the driver information element, the driver license reading out means may be operative to further read out the driver information element stored in the electronic driver license, and the engine operation judging means may be operative to judge whether or not the operation of the engine is to be enabled in response to the driver information element read-out by the driver license reading out means in the event that the vehicle communication means fails to receive the control signal.

The identification information transmitting unit may be operative to transmit the identification information element read out by the driver license reading out means to the driver license management apparatus at predetermined time intervals, and the engine operation judging means may be operative to judge whether or not the operation of the engine is to be enabled whenever the identification information transmitting unit transmits the identification information element read out by the driver license reading out means to the driver license management apparatus. The engine operation judging means may not be operative to transmit a disable signal indicating that the operation of the engine is to be disabled until the engine is stopped in the event that the engine operation judging means judges that the operation of the engine is not to be enabled while the engine is operating, and the engine operation control apparatus may be operative to assume the vehicle protection state in which the engine operation control apparatus disables the operation of the engine in response to the disable signal.

The vehicle security control apparatus may further include: identification information storage means for storing therein identification information elements whose electronic driver licenses have been judged to be valid, and authorizing means for generating a certificate signal authorizing the validity of the identification information element read out by the driver license reading out means on the basis of the identification information elements stored in the identification information storage means, and the engine operation judging means may be operative to judge whether or not the operation of the engine is to be enabled in response to the certificate signal generated by the authorizing means and the result of the judgment indicated by the control signal received from the driver license management apparatus.

In accordance with a second aspect of the present invention, there is provided a vehicle security control apparatus comprising: driver license reading out means for reading out the identification information element stored in the electronic driver license; identification information transmitting unit for transmitting the identification information element read out by the driver license reading out means to a driver license management apparatus; and engine operation judging means for judging whether or not the operation of the engine is to be enabled in response to a control signal received from the driver license management apparatus; and the engine operation judging means operative to selectively transmit an enable signal indicating that the operation of the engine is to be enabled and a disable signal indicating that the operation of the engine is to be disabled to an engine operation control apparatus on the basis of a result of the judgment.

In accordance with a third aspect of the present invention, there is provided a vehicle unlocking apparatus comprising a vehicle communication means for receiving an unlock signal from a base station and lock control means for unlocking lock in response to the unlock signal received by the vehicle communication means.

In accordance with a fourth aspect of the present invention, there is provided a method of controlling a vehicle security system for protecting a vehicle against use by an unauthorized person, comprising: a preparing step of a base station, located away from the vehicle, for transmitting a control signal; and a vehicle unlocking apparatus, provided in the vehicle, including: vehicle communication means for receiving the control signal from the base station; and a vehicle component whose operation is necessary to drive the vehicle, the vehicle component being operable to selectively assume two operation states including a vehicle drive state in which the vehicle component allows the vehicle to be used and a vehicle protection state in which the vehicle component protect the vehicle from being used in response to the control signal received by the vehicle communication means; and a control step of having the vehicle component selectively assume two operation states including a vehicle drive state in which the vehicle component allows the vehicle to be used and a vehicle protection state in which the vehicle component protect the vehicle from being used in response to the control signal received by the vehicle communication means.

BRIEF DESCRIPTION OF THE DRAWINGS

The present invention and many of the attendant advantages thereof will be better understood from the following detailed description when considered in connection with the accompanying drawings, wherein.

DESCRIPTION OF THE PREFERRED EMBODIMENTS

The following description will be directed to preferred embodiments of the vehicle security system according to the present invention with reference to FIGS. 1 to 9.

The first embodiments of the vehicle security system 100 according to the present invention will now be described in detail hereinafter with reference to FIG. 1.

The construction of the vehicle security system 100 according to the first embodiment of the present invention will firstly be described.

Figure 1:
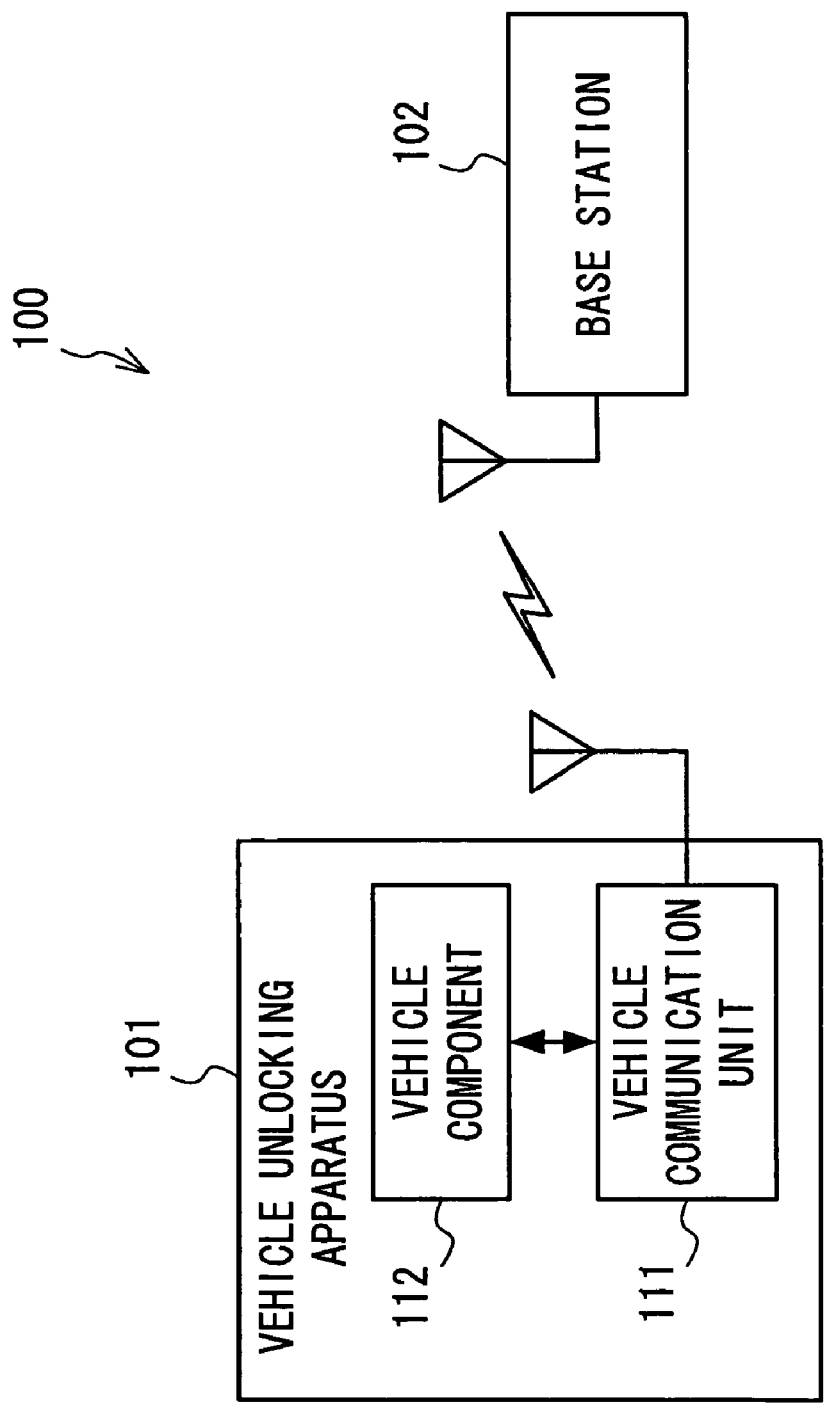
FIG. 1 is a block diagram of a first embodiment of the vehicle security system according to the present invention.

Referring to FIG. 1 of the drawings, there is shown a vehicle security system 100 for protecting a vehicle against use by an unauthorized person. The vehicle security system 100 is shown in FIG. 1 as comprising: a base station 102 located away from the vehicle, and a vehicle unlocking apparatus 101 provided in the vehicle. The base station 102 is adapted to transmit a control signal. The vehicle unlocking apparatus 101 includes vehicle communication means constituted by a vehicle communication unit 111 for receiving the control signal from the base station 102, and a vehicle component 112 whose operation is necessary to drive the vehicle. The vehicle component 112 may include for example a door lock, a power supply unit, an engine operation unit, and/or the like. The vehicle component 112 is operable to selectively assume two operation states including a vehicle drive state in which the vehicle component 112 allows the vehicle to be used and a vehicle protection state in which the vehicle component 112 protects the vehicle from being used. In the present embodiment, the vehicle component 112 is operable to assume the vehicle drive state in which the vehicle component 112 allows the vehicle to be used in response to the control signal received by the vehicle communication unit 111. The vehicle unlocking apparatus 101 has a central processing unit, hereinlater referred to simply as a "CPU", not shown in FIG. 1 for controlling the whole operation of the vehicle unlocking apparatus 101. Similarly, the base station 102 has a central processing unit, hereinlater referred to simply as a "CPU", not shown in FIG. 1 for controlling the whole operation of the base station 102.

The following description will now be directed to the process controlled by the CPUs of the vehicle unlocking apparatus 101 and the base station 102 to employ the method of controlling the first embodiment of the vehicle security system 100 according to the present invention with no flowchart under the assumption that a user of the vehicle lost an electronic key of the vehicle, and the base station 102 has stored therein information about a plurality of vehicles and a plurality of the vehicle users.

The user of the vehicle transmits to the base station 102, which has information about the electronic key of the vehicle, an unlock request for unlocking the vehicle by way of a transmitter. The transmitter is, for example, user's mobile phone. The base station 102 is operated to judge whether or not the unlock request is transmitted by an authorized person on the basis of the telephone number of the mobile phone. According to the present invention, the user may input a password to the mobile phone upon transmitting the unlock request, and the base station 102 may be operated to judge whether or not the unlock request is transmitted by an authorized person on the basis of the password. The base station 102 is provided with storage means constituted by a storage unit, not shown in FIG. 1, for accumulatively storing therein information collected upon receiving unlock requests from the vehicle unlocking apparatus 101 as records of unlock request. The information collected upon receiving an unlock request may include for example the telephone number, the password of the user, date and time at which the unlock request is received, and/or the like. The storage unit of the base station 102 thus constructed serves as a database of the records of unlock request, thereby making it possible for the unlock requests to be reviewed later.

When it is judged that the unlock request is not transmitted by an authorized person, the base station 102 is operated to transmit no control signal to the vehicle. When it is, on the other hand, judged that the unlock request is transmitted by an authorized person, the base station 102 is operated to transmit a control signal to the vehicle. The vehicle communication unit 111 of the vehicle unlocking apparatus 101 is operated to receive the control signal from the base station 102, and the vehicle component 112 is operated to assume the vehicle drive state in which the vehicle component 112 allows the vehicle to be used in response to the control signal received by the vehicle communication means 111.

From the foregoing description, it is to be understood that the first embodiments of the vehicle security system 100 thus constructed can be remotely deactivated and activated by means of the base station 102, thereby enabling to promptly unlock the doors of the vehicle even if the user lost the electronic key.

As will be seen from the above, here has been described only the electronic key for the purpose of simplifying the description and assisting in understanding about the whole operation of the vehicle security system. In reality, the electronic key may be replaced by any other means such as for example a mechanical key, an ID card, or the like as long as it contains the identification information.

Although there has been described in the above about the first embodiment of the vehicle security system according to the present invention, the first embodiment may be replaced by second to fourth embodiments of the vehicle security system in order to attain the objects of the present invention. The second to fourth embodiments of the vehicle security system will then be described hereinlater.

Referring FIGS. 2 to 9 of the drawings, there are shown block diagrams of the second to fourth embodiments of the vehicle security system according to the present invention. The constitutional elements and the steps of the second to fourth embodiment of the vehicle security system according to the present invention as shown in FIGS. 2 to 9 are entirely the same as those of the first embodiment of the vehicle security system according to the present invention as shown in FIG. 1 except for the constitutional elements and the steps appearing in the following description. Therefore, only the constitutional elements and the steps of the second to fourth embodiments of the vehicle security system different from those of the first embodiment of the vehicle security system will be described in detail hereinafter.

The second embodiment of the vehicle security system 200 according to the present invention is similar to the first embodiment except for the fact that the vehicle component is constituted by a lock, the vehicle unlocking apparatus 201 further includes lock control means for controlling the lock to selectively assume the vehicle drive state in which the lock control means unlocks the lock, and the vehicle protection state in which the lock control means locks the lock in response to the control signal received by the vehicle communication means constituted by a vehicle communication unit 211.

Figure 2:
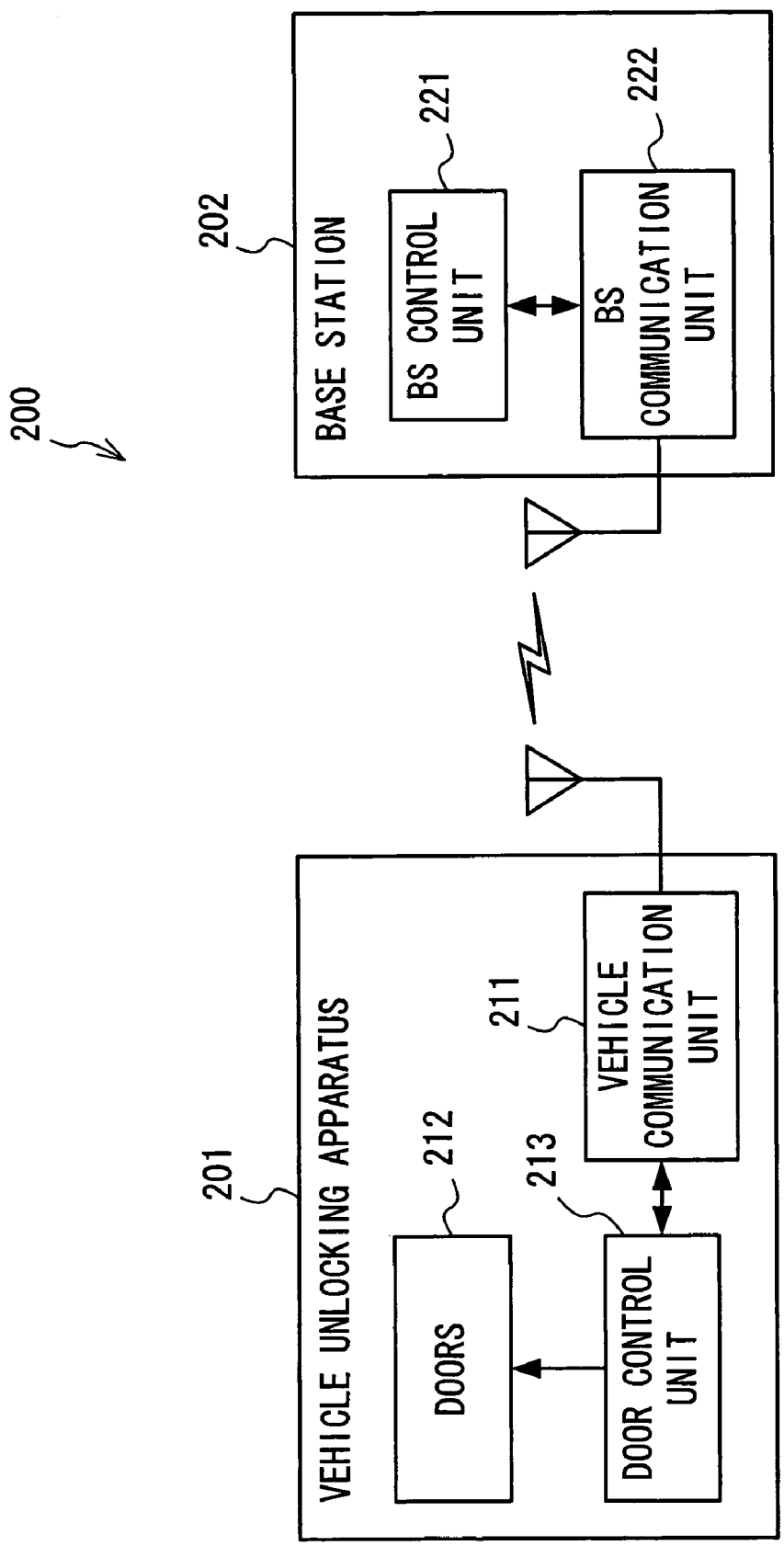
FIG. 2 is a block diagram of a second embodiment of the vehicle security system according to the present invention.
Figure 3:
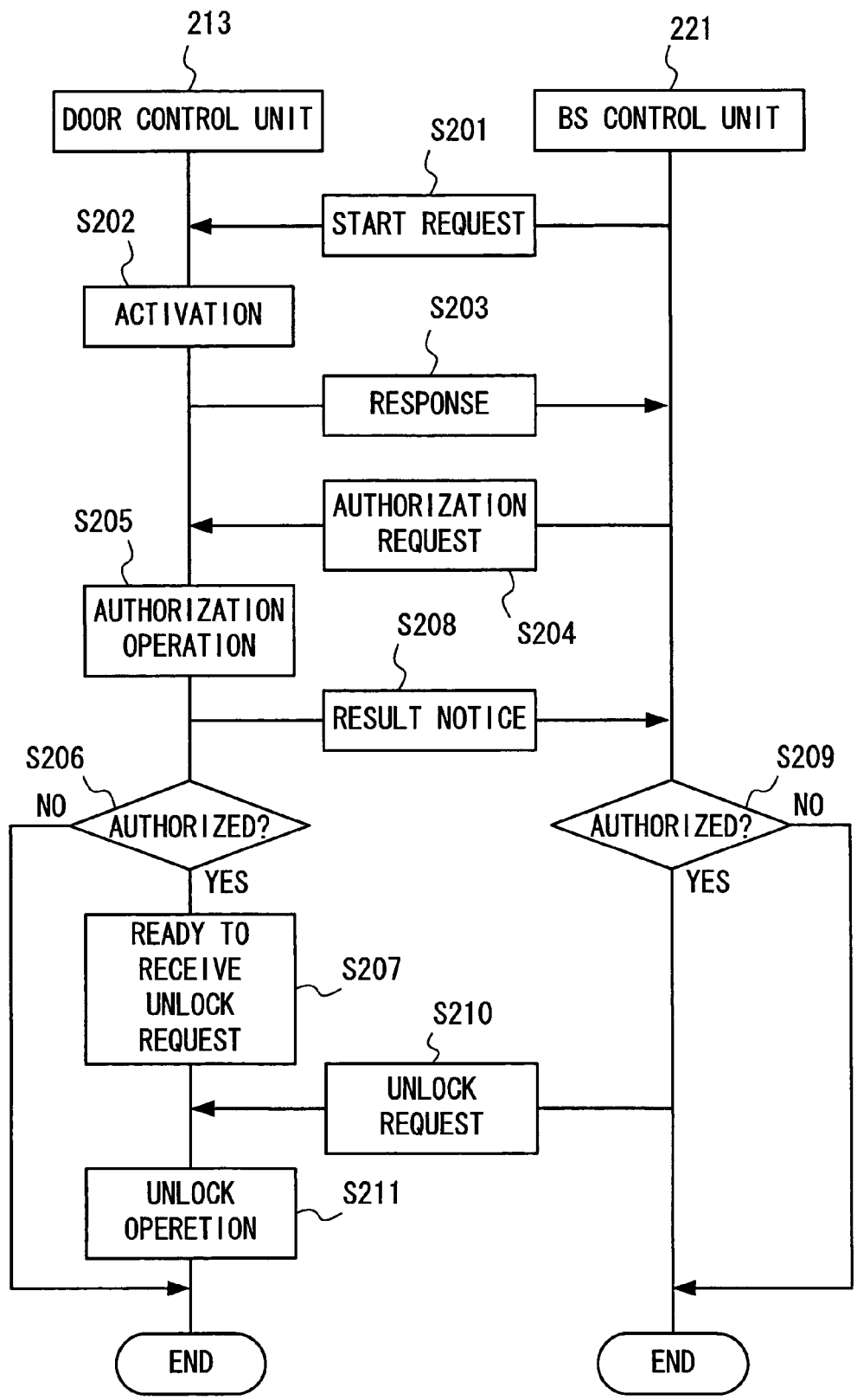
FIG. 3 is a flowchart showing the process performed by the vehicle security system shown in FIG. 2.

The following description will be directed to the constitutional elements and the steps of the second embodiment of the vehicle security system different from those of the first embodiment of the vehicle security system with reference to FIGS. 2 and 3.

As best shown in FIG. 2, in the second embodiment of the vehicle security system 200 according to the present invention, the vehicle component is constituted by a plurality of doors 212, the vehicle unlocking apparatus 201 further includes lock control means constituted by a door control unit 213 for controlling the doors 212 to selectively assume the vehicle drive state in which the door control unit 213 unlocks the doors 212, and the vehicle protection state in which the door control unit 213 locks the doors 212 in response to the control signal received by the vehicle communication means constituted by a vehicle communication unit 211. The doors 212 may include a trunk. The base station 202 includes a base station communication unit, hereinlater referred to as a BS communication unit 222 for communicating with the vehicle communication unit 211, and a base station control unit, hereinlater referred to as a BS control unit 221 for controlling the whole operation of the base station 202.

The base station 202 is operative to transmit as the control signal an authorization signal and an unlock signal. The vehicle unlocking apparatus 201 further includes: a driving authorization unit, not shown, for generating a certificate signal authorizing the validity of the base station 202 on the basis of the authorization signal received by the vehicle communication unit 211. The door control unit 213 is operative to assume the vehicle drive state in which the door control unit 213 unlocks the doors 212 in response to the unlock signal only when the certificate signal is generated by the driving authorization unit.

The following description will now be directed to the process controlled by the door control unit 213 and the BS control unit 221 to employ the method of controlling the second embodiment of the vehicle security system according to the present invention with reference to FIG. 3 under the assumption that a user of the vehicle lost an electronic key of the doors 212 of the vehicle, and the base station 202 has stored therein information about a plurality of vehicles and a plurality of the vehicle users.

The user of the vehicle transmits to the base station 202, which has information about the electronic key of the vehicle, an unlock request for unlocking the lock of the vehicle by way of a transmitter. The transmitter is, for example, user's mobile phone. The base station 202 is operated to judge whether or not the unlock request is transmitted by an authorized person on the basis of the telephone number of the mobile phone. According to the present invention, the user may input a password to the mobile phone upon transmitting the unlock request, and the base station 202 may be operated to judge on the basis of the password. The base station 202 is provided with storage means constituted by a storage unit, not shown in FIG. 2, for accumulatively storing therein information collected upon receiving unlock requests from the vehicle unlocking apparatus 101 as records of unlock request. The information collected upon receiving the unlock request may include for example the telephone number, the password of the user, date and time at which the unlock request is received, and/or the like. The storage unit of the base station 202 thus constructed serves as a database of the records of unlock request, thereby making it possible for the unlock requests to be reviewed later. Furthermore, the base station 202 may accumulatively store in the storage unit information about the control signals upon transmitting control signals to the vehicle unlocking apparatus 201 as records of control signal. The information about the control signals may include the serial number of the lock, the vehicle number of the vehicle, the name of the user, a result of the unlock operation, and/or the like. Preferably, the storage unit of the base station 202 should store therein the records of unlock request respectively in association with the records of control signal.

In the step S201, the base station 202 is operated to transmit a start request to the vehicle communication unit 211 of the vehicle unlocking apparatus 201 via the BS communication unit 222 in response to the unlock request received from the user of the vehicle. The step S201 goes forward to the step S202, in which the vehicle unlocking apparatus 201 is activated in response to the start request received by the vehicle communication unit 211. According to the present invention, the vehicle unlocking apparatus 201 may be activated at predetermined time intervals so as to be promptly prepared for the start request. The step S202 goes forward to the step S203, in which the vehicle unlocking apparatus 201 is operated to transmit a response signal to the base station 202.

The step S203 goes forward to the step S204, in which the base station 202 is operated to transmit an authorization signal indicative of an authorization request to the vehicle communication unit 211 of the vehicle unlocking apparatus 201. The step S204 goes forward to the step S205, in which the vehicle unlocking apparatus 201 is operated to judge whether or not the base station 202 is authorized, i.e., the base station 202 has the right to transmit an unlock signal to the vehicle unlocking apparatus 201. When it is judged in the step S206 that the base station 202 has been judged to be authorized in the step S205, the step S206 goes forward to the step S207, in which the vehicle unlocking apparatus 201 is operated to generate a certificate signal authorizing the validity of the base station 202. In response to the certificate signal, the vehicle unlocking apparatus 201 is operated to get ready to receive an unlock signal. When it is, on the other hand, judged in the step S206 that the base station 202 has not been judged to be authorized in the step S205, the step S206 goes forward to the step END.

In the step S208, the vehicle unlocking apparatus 201 is operated to transmit a result notice indicative of a result of judgment made in the step S205 to the base station 202. The step S208 goes forward to the step S209, in which the base station 202 is operated to judge whether or not the base station 202 has been judged by the vehicle unlocking apparatus 201 to be authorized on the basis of the result notice. When it is judged that the base station 202 has been judged to be authorized, the step S209 goes forward to the step S210, in which the base station 202 is operated to transmit an unlock signal to the vehicle unlocking apparatus 201. When it is, on the other hand, judged that the base station 202 has not been judged to be authorized, the step S209 goes forward to the step END.

The step S210 goes forward to the step S211, in which the door control unit 213 of the vehicle unlocking apparatus 201 is operated to assume the vehicle drive state in which the door control unit 213 unlocks the doors 212 in response to the unlock signal.

From the foregoing description, it is to be understood that the second embodiments of the vehicle security system 200 thus constructed can be remotely deactivated and activated by means of the base station 202, thereby enabling to promptly unlock the doors of the vehicle even if the user lost the electronic key.

As will be seen from the above, here has been described only the electronic key for the purpose of simplifying the description and assisting in understanding about the whole operation of the vehicle security system. In reality, the electronic key may be replaced by any other means such as for example a mechanical key, an ID card, or the like as long as it contains the identification information.

While it has been described in the above that the lock is constituted by a plurality of doors 212 and lock control means is constituted by a door control unit 213, the vehicle unlocking apparatus 201 of the vehicle security system 200 may be constituted by any other means as long as the lock control means can control the lock to selectively assume the vehicle drive state in which the lock control means unlocks the lock, and the vehicle protection state in which the lock control means locks the lock in response to the control signal. This means that the lock may be constituted by, for example, an engine, an electronic component, and/or the like, and the lock control means is constituted by engine control unit, electronic control unit, and/or the like.

Figure 4:
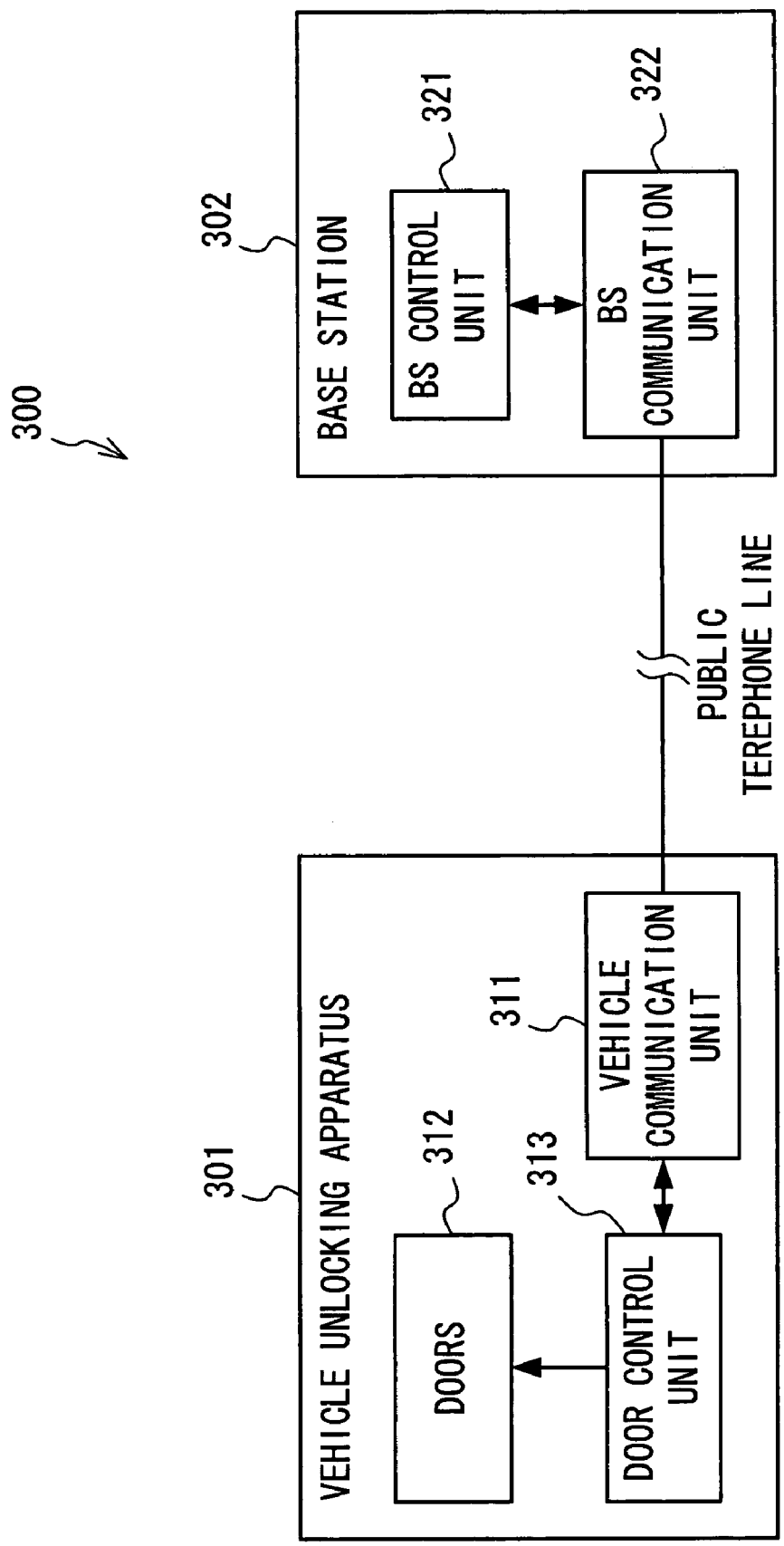
FIG. 4 is a block diagram of a third embodiment of the vehicle security system according to the present invention.
Figure 5:
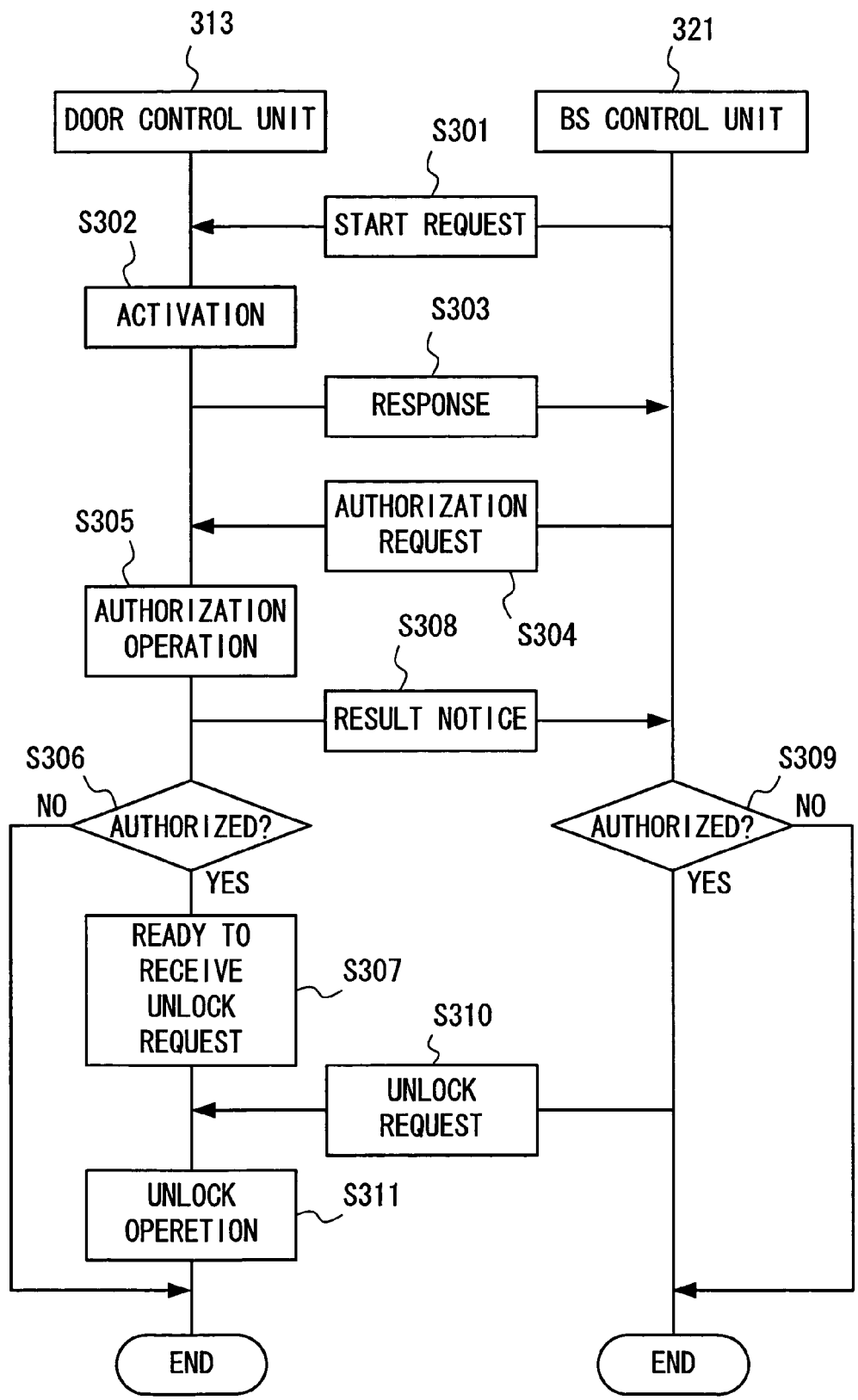
FIG. 5 is a flowchart showing the process performed by the vehicle security system shown in FIG. 4.

The following description will be directed to the constitutional elements and the steps of the third embodiment of the vehicle security system different from those of the first embodiment of the vehicle security system with reference to FIGS. 4 and 5.

As best shown in FIG. 4, in the third embodiment of the vehicle security system 300 according to the present invention, the vehicle component is constituted by a plurality of doors 312, the vehicle unlocking apparatus 301 further includes lock control means constituted by a door control unit 313 for controlling the doors 312 to selectively assume the vehicle drive state in which the door control unit 313 unlocks the doors 312, and the vehicle protection state in which the door control unit 313 locks the doors 312 in response to the control signal received by the vehicle communication means constituted by a vehicle communication unit 311. The doors 312 may include a trunk. The vehicle communication unit 311 is operative to communicate with the base station 302 by means of a public telephone line. The base station 302 includes a base station communication unit, hereinlater referred to as a BS communication unit 322 for communicating with the vehicle communication unit 211, and a base station control unit, hereinlater referred to as a BS control unit 321 for controlling the whole operation of the base station 302.

The base station 302 is operative to transmit as the control signal an authorization signal and an unlock signal. The vehicle unlocking apparatus 301 further includes: a driving authorization unit, not shown, for generating a certificate signal authorizing the validity of the base station 302 on the basis of the authorization signal received by the vehicle communication unit 311. The door control unit 313 is operative to assume the vehicle drive state in which the door control unit 313 unlocks the doors 312 in response to the unlock signal only when the certificate signal is generated by the driving authorization unit.

The following description will now be directed to the process controlled by the door control unit 313 and the BS control unit 321 to employ the method of controlling the second embodiment of the vehicle security system according to the present invention with reference to FIG. 4 under the assumption that a user of the vehicle lost an electronic key of the doors 312 of the vehicle, and the base station 302 has stored therein information about a plurality of vehicles and a plurality of the vehicle users.

The user of the vehicle transmits to the base station 302, which has information about the electronic key of the vehicle, an unlock request for unlocking the lock of the vehicle.

In the step S301, the base station 302 is operated to transmit a start request to the vehicle communication unit 311 of the vehicle unlocking apparatus 301 by the BS communication unit 322 through a public telephone line in response to the unlock request received from the user of the vehicle. The step S301 goes forward to the step S302, in which the vehicle unlocking apparatus 301 is activated in response to the start request received by the vehicle communication unit 311. According to the present invention, the vehicle unlocking apparatus 301 may be activated at predetermined time intervals so as to be promptly prepared for the start request. The step S302 goes forward to the step S303, in which the vehicle unlocking apparatus 301 is operated to transmit a response signal to the base station 302.

The step S303 goes forward to the step S304, in which the base station 302 is operated to transmit an authorization signal indicative of an authorization request to the vehicle communication unit 311 of the vehicle unlocking apparatus 301 through the public telephone line. The step S304 goes forward to the step S305, in which the vehicle unlocking apparatus 301 is operated to judge whether or not the base station 302 is authorized, i.e., the base station 302 has the right to transmit an unlock signal to the vehicle unlocking apparatus 301. When it is judged in the step S306 that the base station 302 has been judged to be authorized in the step S305, the step S306 goes forward to the step S307, in which the vehicle unlocking apparatus 301 is operated to generate a certificate signal authorizing the validity of the base station 302. In response to the certificate signal, the vehicle unlocking apparatus 301 is operated to get ready to receive an unlock signal. When it is, on the other hand, judged in the step S306 that the base station 302 has not been judged to be authorized in the step S305, the step S306 goes forward to the step END.

In the step S308, the vehicle unlocking apparatus 301 is operated to transmit a result notice indicative of a result of judgment made in the step S305 to the base station 302. The step S308 goes forward to the step S309, in which the base station 302 is operated to judge whether or not the base station 302 has been judged by the vehicle unlocking apparatus 301 to be authorized on the basis of the result notice. When it is judged that the base station 302 has been judged to be authorized, the step S309 goes forward to the step S310, in which the base station 302 is operated to transmit an unlock signal to the vehicle unlocking apparatus 301. When it is, on the other hand, judged that the base station 302 has not been judged to be authorized, the step S309 goes forward to the step END.

The step S310 goes forward to the step S311, in which the door control unit 313 of the vehicle unlocking apparatus 301 is operated to assume the vehicle drive state in which the door control unit 313 unlocks the doors 312 in response to the unlock signal.

From the foregoing description, it is to be understood that the third embodiments of the vehicle security system 300 thus constructed can be remotely deactivated and activated by means of the base station 302, thereby enabling to promptly unlock the doors of the vehicle even if the user lost the electronic key.

As will be seen from the above, here has been described the electronic key for the purpose of simplifying the description and assisting in understanding about the whole operation of the vehicle security system. In reality, the electronic key may be replaced by any other means such as for example a mechanical key, an ID card, or the like as long as it contains the identification information.

Though it has been described in the previous embodiments that the vehicle unlocking apparatus comprises a vehicle communication unit, the vehicle unlocking apparatus may comprise any other means as long as the vehicle unlocking apparatus can communicate with the base station. The vehicle communication unit may be replaced by, for example, a mobile phone. The vehicle unlocking apparatus thus constructed can be simple in construction and cheap in production cost.

As a modification of the previous embodiments of the vehicle security system according to the present invention, the base station may be connected with the Internet and have a home page at a web site. In this modified embodiment, the user of the vehicle may firstly access to the home page at the web site with a login password, and then input an unlock request on the home page at the web site into the base station. The modified embodiment of the vehicle security system thus constructed makes it possible for the user of the vehicle to access a home page of the base station and input an unlock request via the home page using a personal computer or a mobile phone.

As another modification of the previous embodiments, the base station may be constituted by a mobile phone capable of being carried by a user. In this modified embodiment, the user of the vehicle may directly input an unlock request into the mobile phone with a password. The mobile phone is operative to judge whether the user is an authorized user or not on the basis of the password, and transmit an unlock signal in response to the unlock request when it is judged that the user is the authorized user. The modified embodiment of the vehicle security system thus constructed can be directly deactivated and activated by the mobile phone, thereby enabling to promptly unlock the doors of the vehicle even if the user lost the electronic key.

While it has been described in the above that the lock is constituted by a plurality of doors 312 and lock control means is constituted by a door control unit 313, the vehicle unlocking apparatus 301 of the vehicle security system 300 may be constituted by any other means as long as the lock control means can control the lock to selectively assume the vehicle drive state in which the lock control means unlocks the lock, and the vehicle protection state in which the lock control means locks the lock in response to the control signal. This means that the lock may be constituted by, for example, an engine, an electronic component, or the like, and the lock control means is constituted by engine control unit, electronic control unit, and/or the like.

Figure 6:
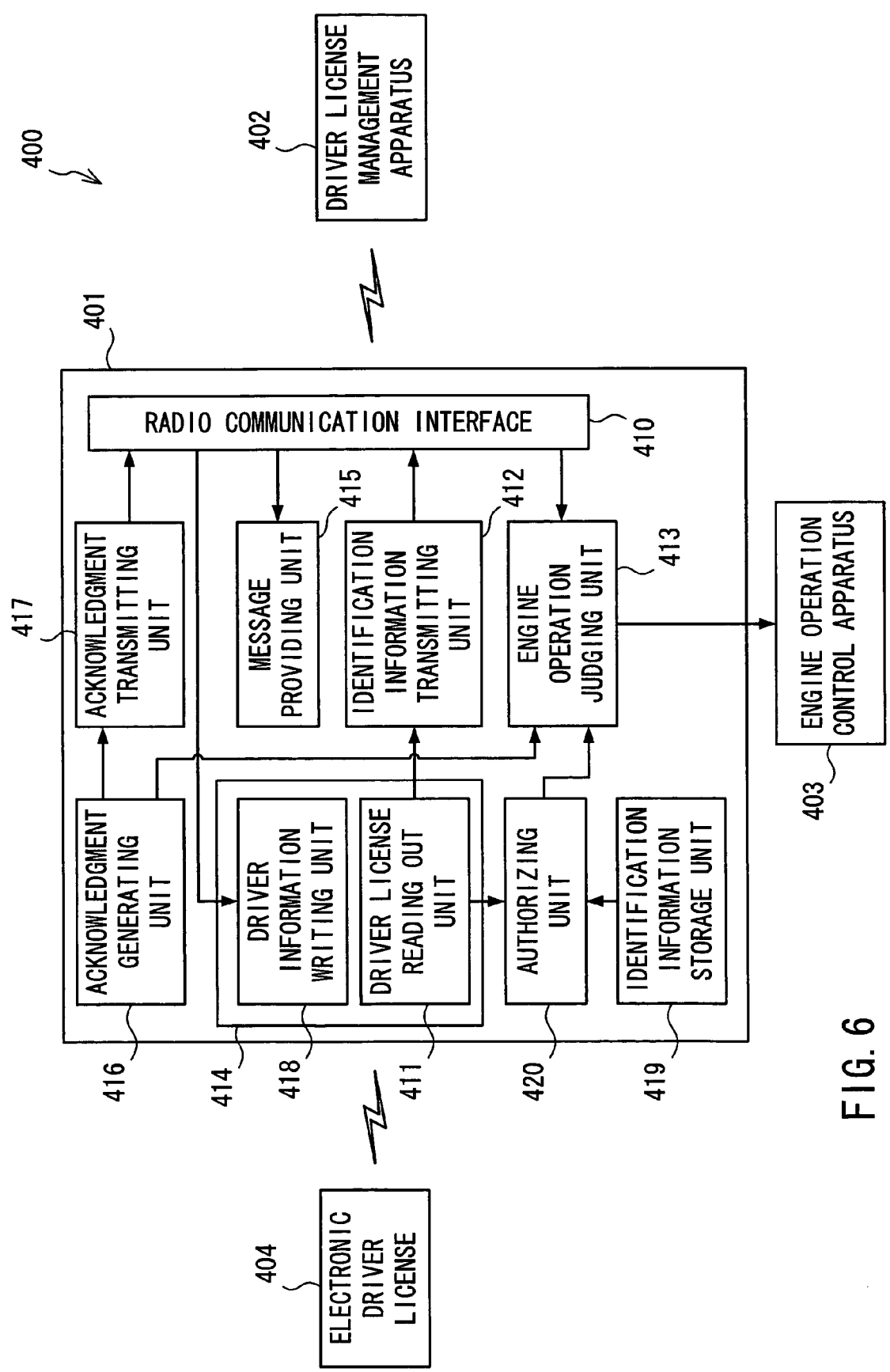
FIG. 6 is a block diagram of a vehicle security control apparatus forming part of a fourth embodiment of the vehicle security system according to the present invention.
Figure 7:
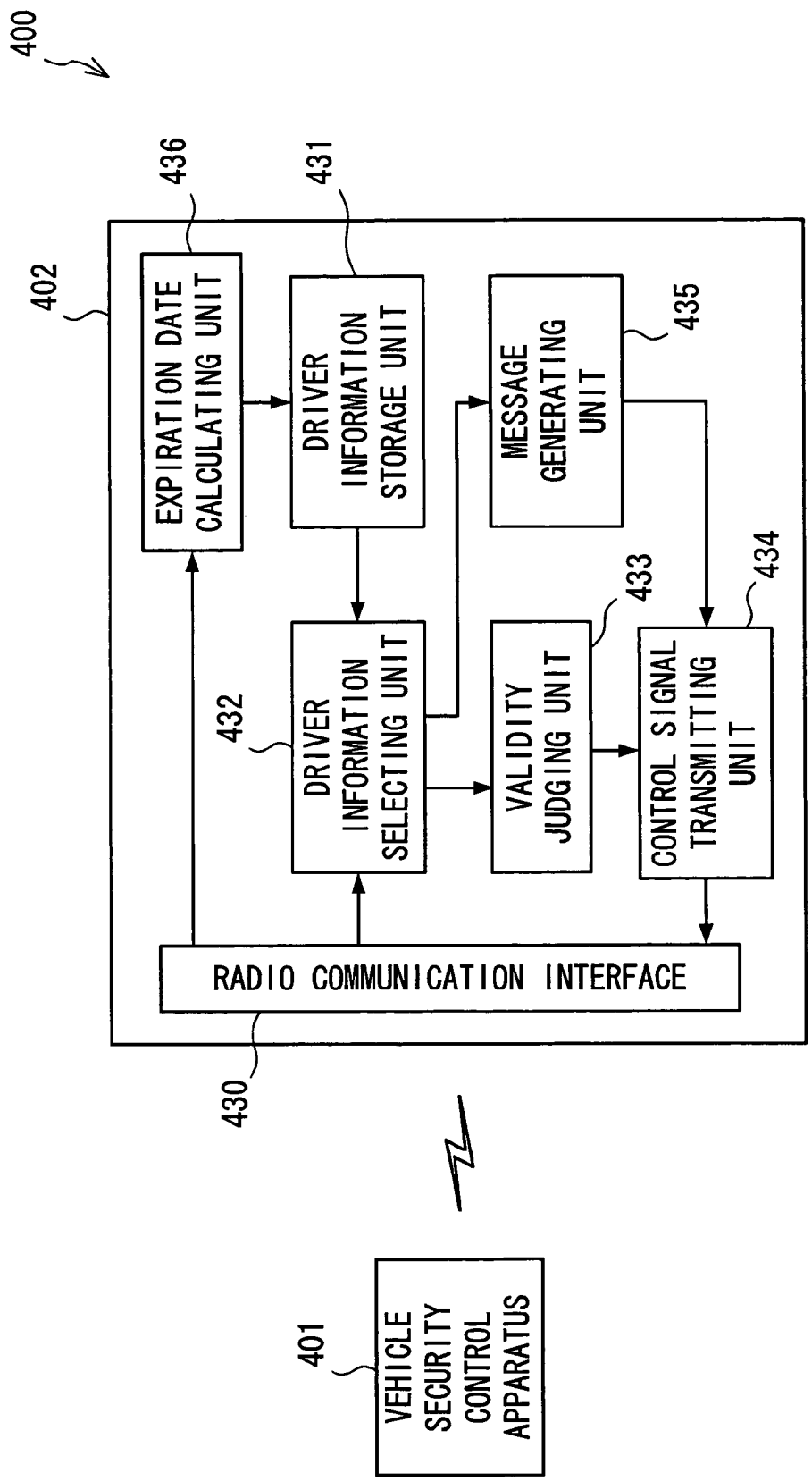
FIG. 7 is a block diagram of a driver license management apparatus forming part of the fourth embodiment of the vehicle security system according to the present invention.
Figure 8:
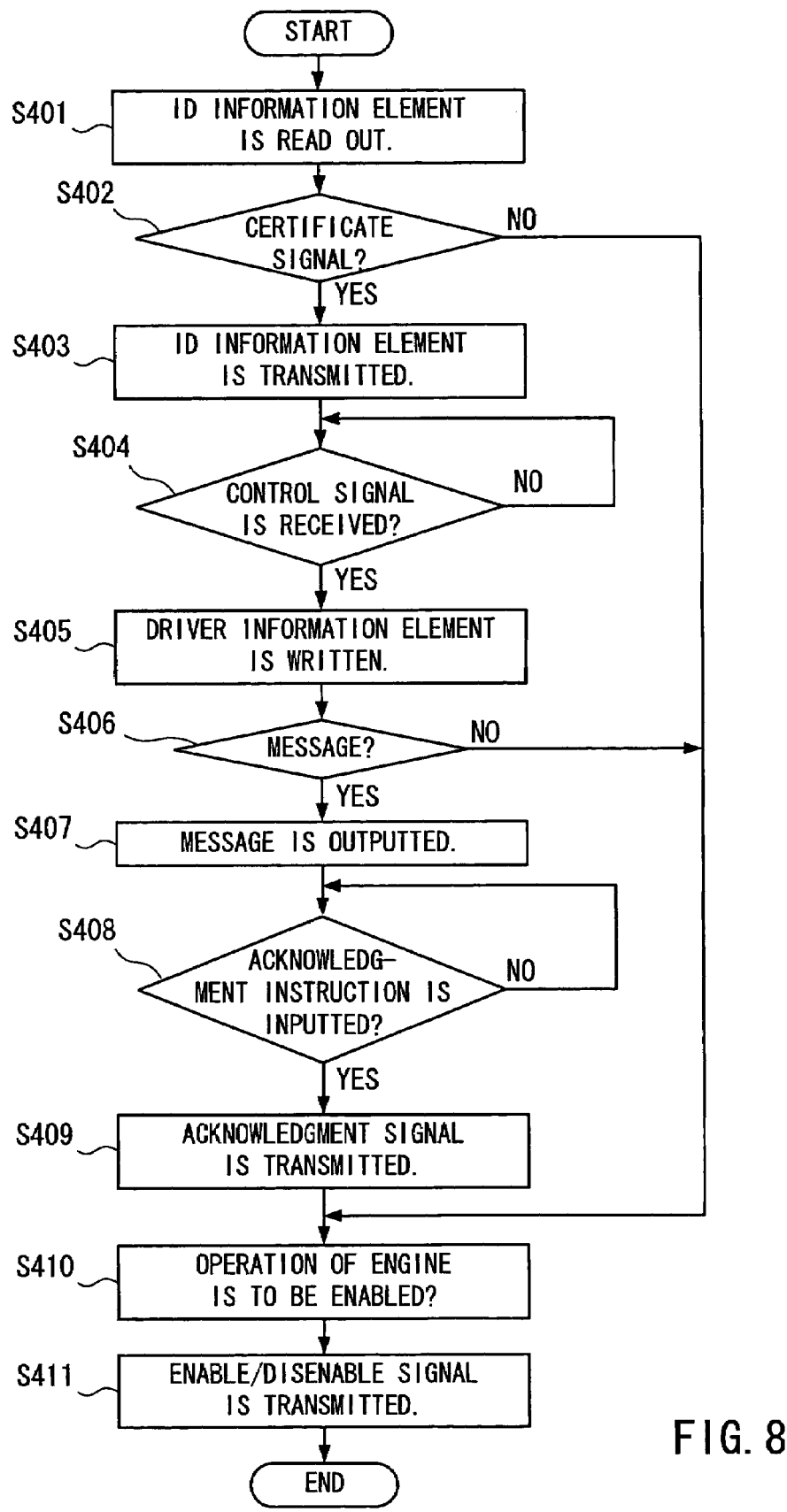
FIG. 8 is a flowchart showing the process performed by the vehicle security control apparatus forming part of the vehicle security system shown in FIG. 6.
Figure 9:
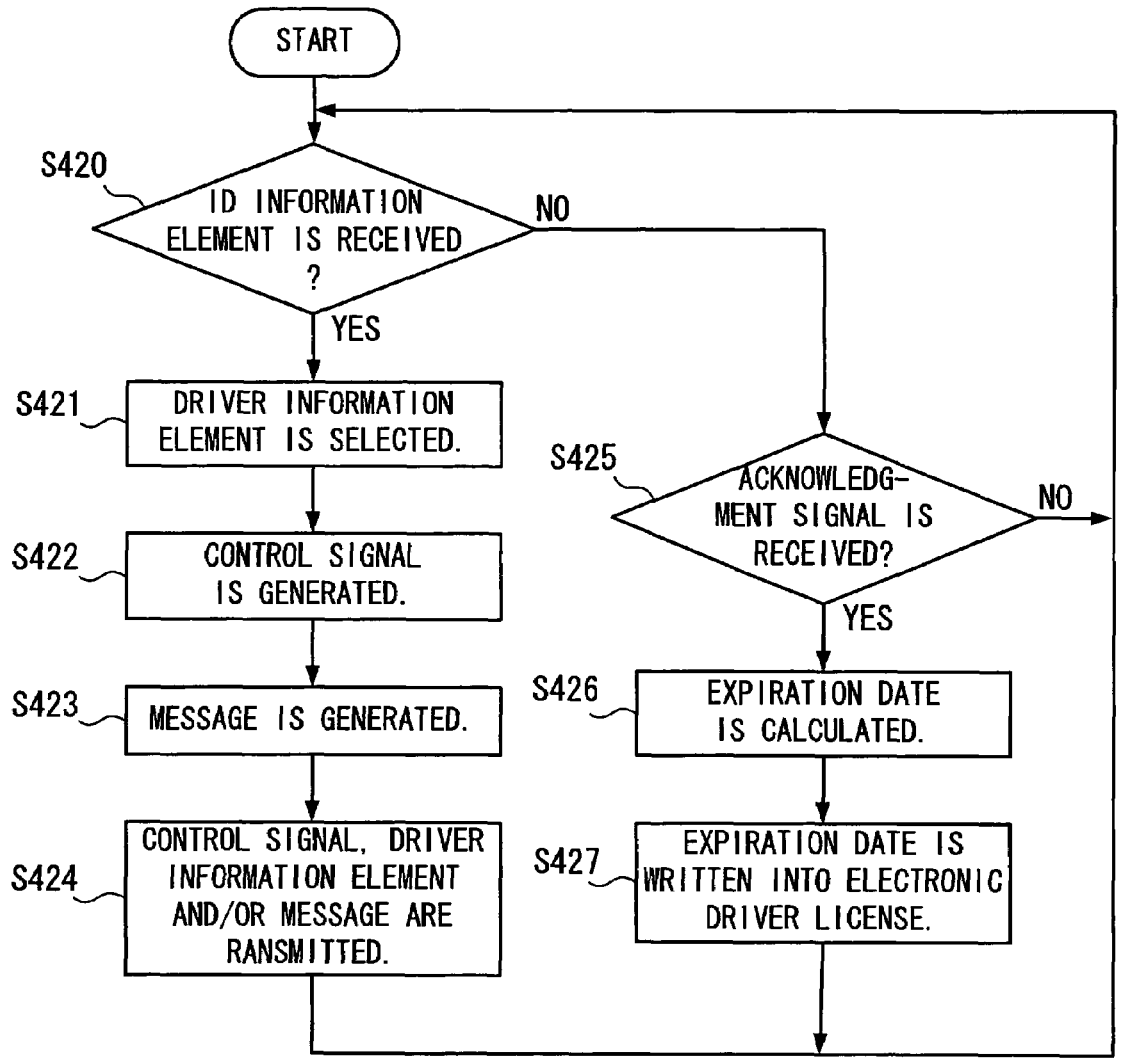
FIG. 9 is a flowchart showing the process performed by the driver license management apparatus forming part of the vehicle security system shown in FIG. 7.
Figure 10:
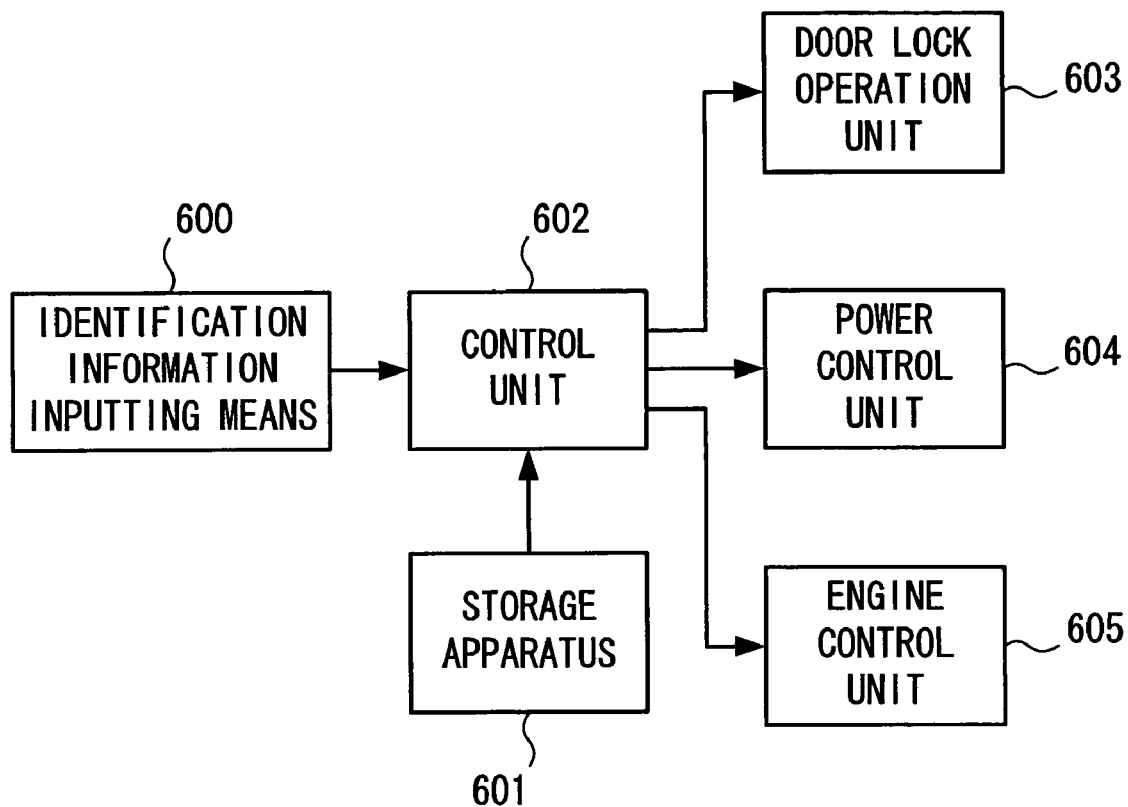
FIG. 10 is a block diagram of a conventional vehicle security system.

The following description will be directed to the constitutional elements and the steps of the fourth embodiment of the vehicle security system different from those of the first embodiment of the vehicle security system with reference to FIGS. 6 and 7.

As best shown in FIG. 6, in the fourth embodiment of the vehicle security system 400 according to the present invention, the vehicle component is constituted by an engine, not shown in FIG. 6, and the vehicle unlocking apparatus is constituted by an engine operation control apparatus 403 for selectively assuming the vehicle drive state in which the engine operation control apparatus 403 enables the operation of the engine, and the vehicle protection state in which the engine operation control apparatus 403 disables the operation of the engine in response to a control signal received by the vehicle communication means constituted by a radio communication interface 410. The radio communication interface 410 is adapted to receive a radio signal from and transmit a radio signal to the base station via a repeater station, not shown in FIG. 6, placed in the vicinity of a road. The radio communication interface 410 includes an antenna, a modulator, a demodulator, and the like. The repeater station may be held in communication with the base station through a communication network such as for example Internet, a public switched telephone network, or the like. Furthermore, the radio communication interface 410 may include a buffer for temporally storing information to be transmitted to and/or received from the base station. In this case, the radio communication interface 410 is required to delete the information stored in the buffer immediately after transmitted and/or received. Preferably, the information transmitted and received between the radio communication interface 410 and the base station should be encrypted, which will become apparent as the description proceeds.

The vehicle unlocking apparatus is further constituted by an electronic driver license 404 capable of being carried by a driver, and a vehicle security control apparatus 401 provided in the vehicle. The electronic driver license 404 is provided with a noncontact IC chip having stored therein an identification information element of the driver. The electronic driver license 404 is designed to be activated with power supplied thereto by way of electromagnetic waves.

The vehicle security control apparatus 401 includes driver license reading out means constituted by a driver license reading out unit 411 for reading out the identification information element stored in the electronic driver license 404. The driver license reading out unit 411 is operative to produce electromagnet waves to supply power to and activate the electronic driver license 404. The electronic driver license 404 thus activated is operative to transmit the identification information element therein stored to the driver license reading out unit 411. The driver license reading out unit 411 forms part of a reader/writer device 414. The vehicle communication means is further constituted by an identification information transmitting unit 412 for transmitting the identification information element read out by the driver license reading out unit 411 to the base station.

The base station is constituted by a driver license management apparatus 402 having stored therein a plurality of driver information elements respectively corresponding to a plurality of identification information elements. The driver license management apparatus 402 is operative to receive the identification information element from the vehicle security control apparatus 401, and select a driver information element corresponding to the identification information element received from the vehicle security control apparatus 401 from among the driver information elements stored in the driver license management apparatus 402. The driver license management apparatus 402 is operative to judge whether or not the electronic driver license 404 is valid on the basis of the driver information element corresponding to the identification information element thus selected, and transmit the control signal indicating the result of the judgment.

The vehicle security control apparatus 401 further includes: engine operation judging means constituted by an engine operation judging unit 413 for judging whether or not the operation of the engine is to be enabled in response to the result of the judgment indicated by the control signal received from the driver license management apparatus 402. The engine operation judging unit 413 is operative to selectively transmit an enable signal indicating that the operation of the engine is to be enabled and a disable signal indicating that the operation of the engine is to be disabled to an engine operation control apparatus 403 on the basis of a result of the judgment. The engine operation control apparatus 403 is operative to assume the vehicle drive state in which the engine operation control apparatus 403 enables the operation of the engine in response to the enable signal and the vehicle protection state in which the engine operation control apparatus 403 disables the operation of the engine in response to the disable signal. The engine operation control apparatus 403 may be constituted by, for example, an immobilizer designed to disable an ignition switch of the engine in response to the disable signal.

As shown in FIG. 7, the driver license management apparatus 402 includes: driver information storage means constituted by a driver information storage unit 431 for storing therein a plurality of driver information elements respectively corresponding to a plurality of identification information elements, driver information selecting means constituted by a driver information selecting unit 432 for selecting a driver information element corresponding to the identification information element received from the vehicle security control apparatus 401 from among the driver information elements stored in the driver information storage unit 431, and validity judging means constituted by a validity judging unit 433 for judging whether or not the electronic driver license 404 is valid on the basis of the driver information element corresponding to the identification information element thus selected.

The driver information storage unit 431 is provided with a nonvolatile memory device such as for example a hard disk, a flush memory, or the like. Each of the driver information elements stored in the driver information storage unit 431 includes information about the holder of an electronic driver license 404 such as, for example, name, registered address, permanent residence address, date of birth, whether or not the driver license has expired, whether or not the driver license is suspended/revoked, at least one of record on traffic accident, record on traffic violation, and record of payment of fine, and/or the like. Each of the driver information elements stored in the driver information storage unit 431 further includes the information about the electronic driver license 404 such as, for example, date of issue, driver license number, type of driver license, date of expiration, authorities concerned, and/or the like. The information about the holder of the electronic driver license 404 of each of the driver information elements stored in the driver information storage unit 431 is regularly updated by the authorities concerned.

The validity judging unit 433 is adapted to judge whether or not the electronic driver license 404 is valid on the basis of the driver information element corresponding to the identification information element selected by the driver information selecting unit 432 from among the driver information elements stored in the driver information storage unit 431, and generate a control signal indicating the result of the judgment. This means that the validity judging unit 433 is operative to generate a control signal indicating that the electronic driver license 404 is, for example, invalid when the driver information element selected by the driver information selecting unit 432 includes information about the holder of an electronic driver license 404 such as, for example, that the driver license has expired, that the driver license is suspended/revoked, that the payment of fine is overdue, or the like.

The driver license management apparatus 402 further includes a radio communication interface 430 for receiving a radio signal from and transmitting a radio signal to the vehicle security control apparatus 401, and control signal transmitting means constituted by a control signal transmitting unit 434 for transmitting the control signal indicating the result of the judgment made by the validity judging unit 433 to the vehicle security control apparatus 401 through the radio communication interface 430. The radio communication interface 430 is adapted to receive a radio signal from and transmit a radio signal to the vehicle security control apparatus 401 via a repeater station placed in the vicinity of a road. The radio communication interface 430 includes an antenna, a modulator, a demodulator, and the like. The radio communication interface 430 may further include, for example, a network driver interface when the driver license management apparatus 402 is held in communication with the repeater station through the communication network such as the Internet.

Preferably, the information transmitted and received between the vehicle security control apparatus 401 and the driver license management apparatus 402 should be encrypted. In this case, each of the vehicle security control apparatus 401 and the driver license management apparatus 402 may have, for example, a public key and a private key. The radio communication interface 410 has stored therein the private key of the vehicle security control apparatus 401 and the public key of the driver license management apparatus 402, and the radio communication interface 430 has stored therein the private key of the driver license management apparatus 402 and the public key of the vehicle security control apparatus 401. The information transmitted from the radio communication interface 410 to the driver license management apparatus 402 is encrypted with the pubic key of the driver license management apparatus 402 and attached with a signature encrypted with the private key of the vehicle security control apparatus 401. The information transmitted from the driver license management apparatus 402 to the radio communication interface 410 is, on the other hand, encrypted with the pubic key of the vehicle security control apparatus 401 and attached with a signature encrypted with the private key of the driver license management apparatus 402.

As shown in FIG. 7, the driver license management apparatus 402 further includes: message generating means constituted by a message generating unit 435 for generating a message to be provided with the holder of the electronic driver license 404 on the basis of the driver information element selected by the driver information selecting unit 432. The control signal transmitting unit 434 is operative to transmit the message generated by the message generating unit 435 to the vehicle security control apparatus 401 through the radio communication interface 430.

The message to be provided with the holder of the electronic driver license 404 includes that a reminder that the driver license is requested to be updated by such and such a date, that a fine is required to be paid by such and such a date, and/or the like. The vehicle security system 400 thus constructed makes it possible for the holder of the electronic driver license 404 to prevent the driver license from expiring or being suspended/revoked due to negligence.

As shown in FIG. 6, the vehicle security control apparatus 401 further includes message providing means constituted by a message providing unit 415 for providing the message transmitted by the control signal transmitting unit 434 with the holder of the electronic driver license 404. The message providing unit 415 may be provided with, for example, a liquid crystal display for displaying the message on a screen thereof, a speaker for acoustically outputting the message, and/or the like. The vehicle security control apparatus 401 further includes acknowledgment generating means constituted by an acknowledgment generating unit 416 for generating an acknowledgment signal in response to user's acknowledgment instruction after the message has been provided. The acknowledgment generating unit 416 may be provided with, for example, a liquid crystal display having a touch panel on a screen thereof, and the user may input an acknowledgment instruction by touching the touch panel.

The engine operation judging unit 413 is not operative to transmit an enable signal indicating that the operation of the engine is to be enabled until the acknowledgment signal is received. The vehicle security control apparatus 401 thus constructed makes it impossible for the user to drive the vehicle unless the user input the acknowledgment instruction into the acknowledgment generating unit 416, thereby ensuring that the message is provided with the holder of the electronic driver license 404. The vehicle security control apparatus 401 further includes acknowledgment transmitting means constituted by an acknowledgment transmitting unit 417 for transmitting the acknowledgment signal generated by the acknowledgment generating unit 416 to the driver license management apparatus 402 through the radio communication interface 410.

As shown in FIG. 7, the driver license management apparatus 402 further includes expiration date calculating means constituted by an expiration date calculating unit 436 for calculating an expiration date on the basis of the date on which the acknowledgment signal is received. In the present embodiment, the expiration date calculating unit 436 is designed to reckon the expiration date from the date on which the acknowledgment signal is received. The expiration date calculating unit 436 is operative to write the expiration date thus calculated into the driver information element stored in the driver information storage unit 431.

The control signal transmitting unit 434 may, however, fail to transmit the control signal to the vehicle security control apparatus 401 mounted on the vehicle when the vehicle happens to drive through a silent zone area where the repeater station placed in the vicinity of the road cannot cover. The engine operation control apparatus 403 is designed to assume the vehicle drive state in which the engine operation control apparatus 403 enables the operation of the engine in response to the enable signal generated by the engine operation judging unit 413 on the basis of the control signal. Without the control signal, the engine operation control apparatus 403 may not assume the vehicle drive state in which the engine operation control apparatus 403 enables the operation of the engine.

In order to solve this problem, the control signal transmitting unit 434 is operative to transmit the driver information element selected by the driver information selecting unit 432 to the vehicle security control apparatus 401 in the present embodiment. As shown in FIG. 6, the vehicle security control apparatus 401 further includes driver information writing means constituted by a driver information writing unit 418 for writing the driver information element transmitted by the control signal transmitting unit 434 into the electronic driver license 404 to have the electronic driver license 404 store therein the driver information element. The driver information writing unit 418 and the driver license reading out unit 411 collectively form a reader/writer device 414. The driver information writing unit 418 is operative to produce electromagnet waves to supply power to and activate the electronic driver license 404. The electronic driver license 404 thus activated is operative to write the driver information element thereinto. The driver license reading out unit 411 is operative to further read out the driver information element stored in the electronic driver license 404, and the engine operation judging unit 413 is operative to judge whether or not the operation of the engine is to be enabled in response to the driver information element readout by the driver license reading out unit 411 in the event that the vehicle communication interface 410 fails to receive said control signal.

The vehicle security control apparatus 401 further includes identification information storage means constituted by an identification information storage unit 419 for storing therein identification information elements whose electronic driver licenses have been judged to be valid, and authorizing means constituted by an authorizing unit 420 for generating a certificate signal authorizing the validity of the identification information element read out by the driver license reading out unit 411 on the basis of the identification information elements stored in the identification information storage unit 419. The identification information storage unit 419 is provided with a nonvolatile memory device such as for example a hard disk, a flush memory, or the like. The identification information storage unit 419 may be further provided with, for example, a liquid crystal display having a touch panel on a screen thereof, and the user may input, edit, or delete each of the identification information elements with the touch panel. The identification information storage unit 419 has stored therein an identification information element of the vehicle owner, which cannot be deleted by an ordinary user. The identification information element of the vehicle owner can be registered or deleted only at limited places such as for example a production plant, dealer's sites, and the like. Alternatively, the identification information element of the vehicle owner may be registered or deleted only by the vehicle owner in the vehicle.

The authorizing unit 420 is designed to compare the identification information element read out by the driver license reading out unit 411 with each of the identification information elements stored in the identification information storage unit 419. The authorizing unit 420 is operative to generate the certificate signal only when the identification information element read out by the driver license reading out unit 411 is matched with one of the identification information elements stored in the identification information storage unit 419. The authorizing unit 420, on the other hand, generates no certificate signal when the identification information element read out by the driver license reading out unit 411 is not matched with any one of the identification information elements stored in the identification information storage unit 419. The engine operation judging unit 413 is operative to judge whether or not the operation of the engine is to be enabled in response to the certificate signal generated by the authorizing unit 420 and the result of the judgment indicated by the control signal received from the driver license management apparatus 402.

The vehicle security control apparatus 401 further includes a central processing unit, hereinlater referred to simply as a "CPU", not shown in FIG. 6, for controlling the whole operation of the vehicle security control apparatus 401 forming part of the fourth embodiment of the vehicle security system 400 according to the present invention. The process of the vehicle security control apparatus 401 controlled by the CPU will be described hereinlater with reference to FIG. 8.

In the step 401, the identification information element stored in the electronic driver license 404 is read out by the driver license reading out unit 411. The step S401 goes forward to the step S402, in which it is judged whether or not the certificate signal is generated by the authorizing unit 420. When it is judged that the certificate signal is generated by the authorizing unit 420, the step S402 goes forward to the step S403. When it is, on the other hand, judged that the certificate signal is not generated by the authorizing unit 420, the step S402 goes forward to the step S410. In the step S403, the identification information element read out by the driver license reading out unit 411 is transmitted to the driver license management apparatus 402 by the identification information transmitting unit 412 through the radio communication interface 410. The step S403 goes forward to the step S404, in which it is judged whether or not a control signal is received through the radio communication interface 410. When it is judged that a control signal is received, the step S404 goes forward to the step S405. When it is, on the other hand, judged that no control signal is received, the process in the step S404 is repeated. In the step S405, the driver information element is written into the electronic driver license 404 by the driver information writing unit 418. In the present embodiment, a driver information element and a message may be received in the step S404, and the control signal and the message may be written into the electronic driver license 404 in the step S405.

The step S405 goes forward to the step S406, in which it is judged whether or not the message is received. When it is judged that the message is received, the step S405 goes forward to the step S407. When it is, on the other hand, judged that the message is not received, the step S405 goes forward to the step S410. In the step S407, the message is provided with the holder of the electronic driver license 404 by the message providing unit 415. The step S407 goes forward to the step S408, in which it is judged whether or not an acknowledgment signal is generated by the acknowledgment generating unit 416 in response to an acknowledgment instruction inputted by the user. When it is judged that the acknowledgment signal is generated, i.e., the acknowledgment instruction is inputted, the step S408 goes forward to the step S409. When it is, on the other hand, judged that no acknowledgment instruction is inputted, the process in the step 408 is repeated.

In the step S409, the acknowledgment signal is transmitted to the driver license management apparatus 402 by the acknowledgment transmitting unit 417 through the radio communication interface 410. The step S409 goes forward to the step S410, in which it is judged by the engine operation judging unit 413 whether or not the operation of the engine is to be enabled in response to the certificate signal generated by the authorizing unit 420 in the step S402 and the result of the judgment indicated by the control signal received in the step S404. The step S410 goes forward to the step S411, in which the enable signal/disable signal is transmitted to the engine operation control apparatus 403 by the engine operation judging unit 413 on the bases of a result of the judgment made in the step S410. In the vehicle security control apparatus according to the present invention, the engine operation control apparatus 403 may be operated to assume the vehicle drive state in which the engine operation control apparatus 403 enables the operation of the engine although the enable signal is not inputted for a predetermined time period.

The driver license management apparatus 402 further includes a central processing unit hereinlater referred to simply as a "CPU", not shown in FIG. 7, for controlling the whole operation of the driver license management apparatus 402 forming part of the fourth embodiment of the vehicle security system 400 according to the present invention. The process of the driver license management apparatus 402 controlled by the CPU will be described hereinlater with reference to FIG. 9.

In the step S420, it is judged whether or not the identification information element transmitted from the vehicle security control apparatus 401 is received by the driver license management apparatus 402 through the radio communication interface 430. When it is judged that the identification information element is received, the step S420 goes forward to the step S421. When it is, on the other hand, judged that no identification information element is received, the step S420 goes forward to the step S425. In the step S421, a driver information element corresponding to the identification information element received from the vehicle security control apparatus 401 is selected by the driver information selecting unit 432 from among the driver information elements stored in the driver information storage unit 431. The step S421 goes forward to the step S422, in which it is judged by the validity judging unit 433 whether or not the electronic driver license 404 is valid on the basis of the driver information element corresponding to the identification information element selected in the step S421, and a control signal indicating the result of the judgment is generated by the validity judging unit 433. The step S422 goes forward to the step S423, in which a message to be provided with the holder of the electronic driver license 404 is generated by the message generating unit 435 on the basis of the driver information element selected by the driver information selecting unit 432. The step S423 goes forward to the step S424, in which the control signal, the driver information element, and/or the message are transmitted by the control signal transmitting unit 434 to the vehicle security control apparatus 401. If the massage is transmitted to the vehicle security control apparatus in the step S424, the acknowledgment signal is expected to be received in the step S425, which will become apparent as the description proceeds. The step S424 goes back to the step S420.

In the step S425, it is judged whether or not the acknowledgment signal is received. When it is judged that the acknowledgment signal is not received, the step S425 goes back to the step S420. When it is, on the other hand, judged that the acknowledgment signal is received, the step S425 goes forward to the step S426, an expiration date is calculated by the expiration date calculating unit 436 on the basis of the date on which the acknowledgment signal is received. In the present embodiment, the expiration date is reckoned by the expiration date calculating unit 436 from the date on which the acknowledgment signal is received. The step S426 goes forward to the step S427, in which the expiration date thus calculated is written by the expiration date calculating unit 436 into the driver information element stored in the driver information storage unit 431.

In the vehicle security control apparatus 401 according to the present invention, the identification information transmitting unit 412 may be operative to transmit the identification information element read out by the driver license reading out unit 411 to the driver license management apparatus 402 at predetermined time intervals, and the engine operation judging unit 413 may be operative to judge whether or not the operation of the engine is to be enabled whenever the control signal is received by the vehicle communication interface 410.

Furthermore, in the vehicle security control apparatus 401 according to the present invention, the engine operation judging unit 413 may not be operative to transmit a disable signal indicating that the operation of the engine is to be disabled until the engine is stopped in the event that the engine operation judging unit 413 judges that the operation of the engine is not to be enabled while the engine is operating. The engine operation control apparatus 403 is operative to assume the vehicle protection state in which the engine operation control apparatus 403 disables the operation of the engine in response to the disable signal transmitted by the engine operation judging unit 413 when the engine is stopped. The vehicle security control apparatus 401 thus constructed, in which the engine operation control apparatus 403 does not assume the vehicle protection state in response to the disable signal until the engine is stopped in the event that the engine operation judging unit 413 judges that the operation of the engine is not to be enabled while the engine still is operating, prevents the vehicle from being stopped while the vehicle is driving due to the result of judgment made by the engine operation judging unit 413. In the case that the engine operation judging unit 413 judges that the operation of the engine is not to be enabled while the engine is operating, the vehicle security control apparatus 401 may provide with the vehicle driver a message that the operation of the engine is to be disabled once the engine is stopped.

According to the present invention, the vehicle security control apparatus 401 may be provided with a control signal storage unit for storing therein the control signal which has been received. The engine operation judging unit 413 may judge whether or not the operation of the engine is to be enabled in response to the control signal stored in the control signal storage unit in the event that the vehicle security control apparatus 401 fails to receive the control signal from the driver license management apparatus 402. Similarly, the electronic driver license 404 may store therein the control signal which has been received. The engine operation judging unit 413 may judge whether or not the operation of the engine is to be enabled in response to the control signal stored in the electronic driver license 404 in the event that the vehicle security control apparatus 401 fails to receive the control signal from the driver license management apparatus 402.

As will be seen from the foregoing description, it is to be understood, the vehicle security system according to the present invention can additionally check whether or not user's driver license is valid although the user has been judged to be the authorized person.

While the subject invention has been described with relation to the preferred embodiments, various modifications and adaptations thereof will now be apparent to those skilled in the art as far as such modifications and adaptations fall within the scope of the appended claims intended to be covered thereby.

What is claimed is:

1. A vehicle security system for protecting a vehicle against use by an unauthorized person, comprising: a base station, located away from the vehicle, for transmitting a control signal and receiving a result signal; and
    a vehicle unlocking apparatus, provided in the vehicle, including:
        vehicle communication means for receiving said control signal from said base station and transmitting said result signal; and
        a vehicle component whose operation is necessary to drive said vehicle, said vehicle component being operable to selectively assume two operation states including a vehicle drive state in which said vehicle component allows said vehicle to be used and a vehicle protection state in which said vehicle component protect said vehicle from being used in response to said control signal received by said vehicle communication means and to provide said result signal in response to the operation of said vehicle component, wherein said result signal comprises a result notice indicative of said base station being authorized to transmit said control signal.

2. A vehicle security system as set forth in claim 1, in which
    said vehicle component comprises a lock, and
    said vehicle unlocking apparatus further includes lock control means for controlling said lock to selectively assume said vehicle drive state in which said lock control means unlocks said lock, and said vehicle protection state in which said lock control means locks said lock in response to said control signal received by said vehicle communication means.

3. A vehicle security system as set forth in claim 2, in which
    said base station is operative to transmit as said control signal an authorization signal and an unlock signal,
    said vehicle unlocking apparatus further includes: a driving authorization unit for generating a certificate signal authorizing the validity of said base station on the basis of said authorization signal received by said vehicle communication means, and
    said lock control means is operative to assume said vehicle drive state in which said lock control means unlocks said lock in response to said unlock signal only when said certificate signal is generated by said driving authorization unit.

4. A vehicle security system as set forth in claim 1, in which
    said base station has therein stored information about a plurality of vehicles and a plurality of vehicle users.

5. A vehicle security system as set forth in claim 2, in which
    said base station is operative to transmit said control signal in response to an unlock request transmitted from said vehicle unlocking apparatus, and
    said base station includes storage means for accumulatively storing therein information collected upon receiving said unlock request from said vehicle unlocking apparatus and information about said control signal upon transmitting said control signal to said vehicle unlocking apparatus.

6. A vehicle security system as set forth in claim 2, in which
    said vehicle communication means is operative to communicate with said base station by means of a public telephone line.

7. A vehicle security system as set forth in claim 1, in which
    said vehicle component comprises an engine, and
    said vehicle unlocking apparatus comprises an engine operation control apparatus for selectively assuming said vehicle drive state in which said engine operation control apparatus enables the operation of said engine, and said vehicle protection state in which said engine operation control apparatus disables the operation of said engine in response to said control signal received by said vehicle communication means.

8. A vehicle security system as set forth in claim 7, in which
    said vehicle unlocking apparatus further comprises:
    an electronic driver license having stored therein an identification information element, said electronic driver license capable of being carried; and
    a vehicle security control apparatus provided in said vehicle, said vehicle security control apparatus including driver license reading out means for reading out said identification information element stored in said electronic driver license;
    said vehicle communication means is constituted by an identification information transmitting unit for transmitting said identification information element read out by said driver license reading out means to said base station,
    said base station is constituted by a driver license management apparatus having stored therein a plurality of driver information elements respectively corresponding to a plurality of identification information elements, said driver license management apparatus operative to select a driver information element corresponding to said identification information element received from said vehicle security control apparatus from among said driver information elements stored in said driver license management apparatus, and judge whether or not said electronic driver license is valid on the basis of said driver information element corresponding to said identification information element thus selected, and transmit said control signal indicating the result of said judgment, said vehicle security control apparatus further includes:

engine operation judging means for judging whether or not the operation of said engine is to be enabled in response to the result of said judgment indicated by said control signal received from said driver license management apparatus, said engine operation judging means is operative to selectively transmit an enable signal indicating that the operation of said engine is to be enabled and a disable signal indicating that the operation of said engine is to be disabled to an engine operation control apparatus on the basis of a result of said judgment, and said engine operation control apparatus is operative to assume said vehicle drive state in which said engine operation control apparatus enables the operation of said engine in response to said enable signal and said vehicle protection state in which said engine operation control apparatus disables the operation of said engine in response to said disable signal.

9. A vehicle security system as set forth in claim 8, in which said driver license management apparatus includes:

driver information storage means for storing therein a plurality of driver information elements respectively corresponding to a plurality of identification information elements;

driver information selecting means for selecting a driver information element corresponding to said identification information element received from said vehicle security control apparatus from among said driver information elements stored in said driver information storage means, validity judging means for judging whether or not said electronic driver license is valid on the basis of said driver information element corresponding to said identification information element thus selected, and control signal transmitting means for transmitting said control signal indicating the result of said judgment made by said validity judging means to said vehicle security control apparatus.

10. A vehicle security system as set forth in claim 8, in which each of said driver information elements includes information about the holder of an electronic driver license, whether or not said electronic driver license has expired, and at least one of a record on a traffic accident, a record on a traffic violation, and a record of payment of a fine.

11. A vehicle security system as set forth in claim 8, in which said driver license management apparatus further includes:

message generating means for generating a message to be provided with the holder of said electronic driver license on the basis of said driver information element selected by said driver information selecting means, said control signal transmitting means is operative to transmit said message generated by said message generating means to said vehicle security control apparatus, and said vehicle security control apparatus further includes message providing means for providing said message transmitted by said control signal transmitting means.

12. A vehicle security system as set forth in claim 11, in which said vehicle security control apparatus further includes acknowledgment generating means for generating an acknowledgment signal in response to user's acknowledgment instruction after said message has been provided, and said engine operation judging means is not operative to transmit an enable signal indicating that the operation of said engine is to be enabled until said acknowledgment signal is received.

13. A vehicle security system as set forth in claim 12, in which said vehicle security control apparatus further includes acknowledgment transmitting means for transmitting said acknowledgment signal generated by said acknowledgment generating means to said driver license management apparatus, said result signal including said acknowledgment signal said driver license management apparatus further includes expiration date calculating means for calculating an expiration date on the basis of the date when said acknowledgment signal is received; and said expiration date calculating means is operative to write said expiration date thus calculated into said driver information element stored in said driver information storage means.

14. A vehicle security system as set forth in claim 9, in which said control signal transmitting means is operative to transmit said driver information element selected by said driver information selecting means to said vehicle security control apparatus, said vehicle security control apparatus includes driver information writing means for writing said driver information element transmitted by said control signal transmitting means into said electronic driver license to have said electronic driver license store therein said driver information element, said driver license reading out means is operative to further read out said driver information element stored in said electronic driver license, and said engine operation judging means is operative to judge whether or not the operation of said engine is to be enabled in response to said driver information element read-out by said driver license reading out means in the event that said vehicle communication means fails to receive said control signal.

15. A vehicle security system as set forth in claim 9, in which said identification information transmitting unit is operative to transmit said identification information element read out by said driver license reading out means to said driver license management apparatus at predetermined time intervals, and said engine operation judging means is operative to judge whether or not the operation of said engine is to be enabled whenever said identification information transmitting unit transmits said identification information element read out by said driver license reading out means to said driver license management apparatus.

16. A vehicle security system as set forth in claim 9, in which said engine operation judging means is not operative to transmit a disable signal indicating that the operation of said engine is to be disabled until said engine is stopped in the event that said engine operation judging means judges that the operation of said engine is not to be enabled while said engine is operating, and said engine operation control apparatus is operative to assume said vehicle protection state in which said engine operation control apparatus disables the operation of said engine in response to said disable signal.

17. A vehicle security system as set forth in claim 9, in which
said vehicle security control apparatus further includes:
identification information storage means for storing therein identification information elements whose electronic driver licenses have been judged to be valid, and
authorizing means for generating a certificate signal authorizing the validity of said identification information element read out by said driver license reading out means on the basis of said identification information elements stored in said identification information storage means, and
said engine operation judging means is operative to judge whether or not the operation of said engine is to be enabled in response to said certificate signal generated by said authorizing means and the result of said judgment indicated by said control signal received from said driver license management apparatus.

18. A vehicle security control apparatus comprising:
driver license reading out means for reading out an identification information element stored in said electronic driver license;
identification information transmitting unit for transmitting said identification information element read out by said driver license reading out means to a driver license management apparatus;
result signaling means for transmitting a result signal to said driver license management system; and
engine operation judging means for judging whether or not the operation of said engine is to be enabled in response to a control signal received from said driver license management apparatus; and
said engine operation judging means operative to selectively transmit an enable signal indicating that the operation of said engine is to be enabled and a disable signal indicating that the operation of said engine is to be disabled to an engine operation control apparatus on the basis of a result of said judgment, wherein said result signal comprises a result notice indicative of said driver license management apparatus being authorized to provide said control signal.

19. A vehicle security control apparatus as set forth in claim 18, further comprising: message providing means for providing a message transmitted by said driver license management apparatus.

20. A vehicle security control apparatus as set forth in claim 19, further comprising acknowledgment generating means for generating an acknowledgment signal in response to user's acknowledgment instruction after said message has been provided, and in which
said engine operation judging means is not operative to transmit an enable signal indicating that the operation of said engine is to be enabled until said acknowledgment signal is received.

21. A vehicle security control apparatus as set forth in claim 20, further comprising acknowledgment transmitting means for transmitting said acknowledgment signal generated by said acknowledgment generating means to said driver license management apparatus, said result signal including said acknowledgment signal.

22. A vehicle security control apparatus as set forth in claim 18, further comprising driver information writing means for writing a driver information element transmitted by said driver license management apparatus into said electronic driver license to have said electronic driver license store therein said driver information element,
said driver license reading out means is operative to further read out said driver information element stored in said electronic driver license, and
said engine operation judging means is operative to judge whether or not the operation of said engine is to be enabled in response to said driver information element read-out by said driver license reading out means in the event that said vehicle communication means fails to receive said control signal.

23. A vehicle security control apparatus as set forth in claim 18, in which
said identification information transmitting unit is operative to transmit said identification information element read out by said driver license reading out means to said driver license management apparatus at predetermined time intervals, and
said engine operation judging means is operative to judge whether or not the operation of said engine is to be enabled whenever said identification information transmitting unit transmits said identification information element read out by said driver license reading out means to said driver license management apparatus.

24. A vehicle security control apparatus as set forth in claim 23, in which
said engine operation judging means is not operative to transmit a disable signal indicating that the operation of said engine is to be disabled until said engine is stopped in the event that said engine operation judging means judges that the operation of said engine is not to be enabled while said engine is operating.

25. A vehicle security control apparatus as set forth in claim 18, further comprising:
identification information storage means for storing therein identification information elements whose electronic driver licenses have been judged to be valid, and
authorizing means for generating a certificate signal authorizing the validity of said identification information element read out by said driver license reading out means on the basis of said identification information elements stored in said identification information storage means, and
said engine operation judging means is operative to judge whether or not the operation of said engine is to be enabled in response to said certificate signal generated by said authorizing means and the result of said judgment indicated by said control signal received from said driver license management apparatus.

26. A method of controlling a vehicle security system for protecting a vehicle against use by an unauthorized person, comprising:
a preparing step of a base station, located away from the vehicle, for transmitting a control signal and receiving a result signal; and a vehicle unlocking apparatus, provided in the vehicle, including: vehicle communication means for receiving said control signal from said base station and transmitting said result signal to said base station; and a vehicle component whose operation is necessary to drive said vehicle, said vehicle component being operable to selectively assume two operation states including a vehicle drive state in which said vehicle component allows said vehicle to be used and a vehicle protection state in which said vehicle component protect said vehicle from being used in response to said control signal received by said vehicle communication means and to provide said result signal in response to the operation of said vehicle component; and a control step of having said vehicle component selectively assume two operation states including a vehicle drive state in which said vehicle component allows said vehicle to be used and a vehicle protection state in which said vehicle component protect said vehicle from being used in response to said control signal received by said vehicle communication means, wherein said result signal comprises a result notice indicative of said base station being authorized to transmit said control signal.

27. A method as set forth in claim 26, in which said vehicle component comprises a lock, and said vehicle unlocking apparatus further includes lock control means for controlling said lock to selectively assume said vehicle drive state in which said lock control means unlocks said lock, and said vehicle protection state in which said lock control means locks said lock in response to said control signal received by said vehicle communication means.

28. A method as set forth in claim 26, in which said vehicle component comprises an engine, and said vehicle unlocking apparatus is constituted by an engine operation control apparatus for selectively assuming said vehicle drive state in which said engine operation control apparatus enables the operation of said engine, and said vehicle protection state in which said engine operation control apparatus disables the operation of said engine in response to said control signal received by said vehicle communication means.

29. A method as set forth in claim 28, in which said vehicle unlocking apparatus is further comprised by:

an electronic driver license having stored therein an identification information element, said electronic driver license capable of being carried; and vehicle security control apparatus provided in said vehicle, said vehicle security control apparatus including driver license reading out means for reading out said identification information element stored in said electronic driver license;

said vehicle communication means is constituted by an identification information transmitting unit for transmitting said identification information element read out by said driver license reading out means to said base station, said base station is constituted by a driver license management apparatus having stored therein a plurality of driver information elements respectively corresponding to a plurality of identification information elements, said driver license management apparatus operative to select a driver information element corresponding to said identification information element received from said vehicle security control apparatus from among said driver information elements stored in said driver license management apparatus, and judge whether or not said electronic driver license is valid on the basis of said driver information element corresponding to said identification information element thus selected, and transmit said control signal indicating the result of said judgment, said vehicle security control apparatus further includes:

engine operation judging means for judging whether or not the operation of said engine is to be enabled in response to the result of said judgment indicated by said control signal received from said driver license management apparatus, said engine operation judging means is operative to selectively transmit an enable signal indicating that the operation of said engine is to be enabled and a disable signal indicating that the operation of said engine is to be disabled to an engine operation control apparatus on the basis of a result of said judgment, and said engine operation control apparatus is operative to assume said vehicle drive state in which said engine operation control apparatus enables the operation of said engine in response to said enable signal and said vehicle protection state in which said engine operation control apparatus disables the operation of said engine in response to said disable signal.

30. A vehicle security system for protecting a vehicle against use by an unauthorized person, comprising: a base station, located away from the vehicle, for transmitting a control signal; and a vehicle unlocking apparatus, provided in the vehicle, including:

vehicle communication means for receiving said control signal from said base station; and a vehicle component whose operation is necessary to drive said vehicle, said vehicle component being operable to selectively assume two operation states including a vehicle drive state in which said vehicle component allows said vehicle to be used and a vehicle protection state in which said vehicle component protect said vehicle from being used in response to said control signal received by said vehicle communication means, wherein:

said vehicle component is constituted by an engine, and said vehicle unlocking apparatus is constituted by an engine operation control apparatus for selectively assuming said vehicle drive state in which said engine operation control apparatus enables the operation of said engine, and said vehicle protection state in which said engine operation control apparatus disables the operation of said engine in response to said control signal received by said vehicle communication means, said vehicle unlocking apparatus being further constituted by:

an electronic driver license having stored therein an identification information element, said electronic driver license capable of being carried; and a vehicle security control apparatus provided in said vehicle, said vehicle security control apparatus including driver license reading out means for reading out said identification information element stored in said electronic driver license;

said vehicle communication means being constituted by an identification information transmitting unit for transmitting said identification information element read out by said driver license reading out means to said base station, said base station being constituted by a driver license management apparatus having stored therein a plurality of driver information elements respectively corresponding to a plurality of identification information elements, said driver license management apparatus operative to select a driver information element corresponding to said identification information element received from said vehicle security control apparatus from among said driver information elements stored in said driver license management apparatus, and judge whether or not said electronic driver license is valid on the basis of said driver information element corresponding to said identification information element thus selected, and transmit said control signal indicating the result of said judgment, said vehicle security control apparatus further including:

engine operation judging means for judging whether or not the operation of said engine is to be enabled in response to the result of said judgment indicated by said control signal received from said driver license management apparatus, said engine operation judging means being operative to selectively transmit an enable signal indicating that the operation of said engine is to be enabled and a disable signal indicating that the operation of said engine is to be disabled to an engine operation control apparatus on the basis of a result of said judgment, and said engine operation control apparatus being operative to assume said vehicle drive state in which said engine operation control apparatus enables the operation of said engine in response to said enable signal and said vehicle protection state in which said engine operation control apparatus disables the operation of said engine in response to said disable signal, said driver license management apparatus includes:

driver information storage means for storing therein a plurality of driver information elements respectively corresponding to a plurality of identification information elements;

driver information selecting means for selecting a driver information element corresponding to said identification information element received from said vehicle security control apparatus from among said driver information elements stored in said driver information storage means, validity judging means for judging whether or not said electronic driver license is valid on the basis of said driver information element corresponding to said identification information element thus selected, and control signal transmitting means for transmitting said control signal indicating the result of said judgment made by said validity judging means to said vehicle security control apparatus, each of said driver information elements includes information about the holder of an electronic driver license, whether or not said electronic driver license has expired, and at least one of a record on a traffic accident, a record on a traffic violation, and a record of payment of a fine, said driver license management apparatus further includes:

message generating means for generating a message to be provided with the holder of said electronic driver license on the basis of said driver information element selected by said driver information selecting means, said control signal transmitting means being operative to transmit said message generated by said message generating means to said vehicle security control apparatus, and said vehicle security control apparatus further includes message providing means for providing said message transmitted by said control signal transmitting means, said vehicle security control apparatus further including acknowledgment generating means for generating an acknowledgment signal in response to user's acknowledgment instruction after said message has been provided, and said engine operation judging means is not operative to transmit an enable signal indicating that the operation of said engine is to be enabled until said acknowledgment signal is received, said vehicle security control apparatus further includes acknowledgment transmitting means for transmitting said acknowledgment signal generated by said acknowledgment generating means to said driver license management apparatus, said driver license management apparatus further including expiration date calculating means for calculating an expiration date on the basis of the date when said acknowledgment signal is received; and said expiration date calculating means is operative to write said expiration date thus calculated into said driver information element stored in said driver information storage means.

31. A vehicle security control apparatus comprising:

a driver license reading out means for reading out an identification information element stored in said electronic driver license;

an identification information transmitting unit for transmitting said identification information element read out by said driver license reading out means to a driver license management apparatus; and an engine operation judging means for judging whether or not the operation of said engine is to be enabled in response to a control signal received from said driver license management apparatus, said engine operation judging means being operative to selectively transmit an enable signal indicating that the operation of said engine is to be enabled and a disable signal indicating that the operation of said engine is to be disabled to an engine operation control apparatus on the basis of a result of said judgment, and;

further comprising: message providing means for providing said message transmitted by said driver license management apparatus, acknowledgment generating means for generating an acknowledgment signal in response to user's acknowledgment instruction after said message has been provided, and in which said engine operation judging means is not operative to transmit an enable signal indicating that the operation of said engine is to be enabled until said acknowledgment signal is received, and;

acknowledgment transmitting means for transmitting said acknowledgment signal generated by said acknowledgment generating means to said driver license management apparatus.

32. A vehicle security system for protecting a vehicle against use by an unauthorized person, comprising: a base station, located away from the vehicle, for transmitting a control signal and receiving a result signal; and a vehicle unlocking apparatus, provided in the vehicle, including:

vehicle communication means for receiving said control signal from said base station and transmitting said result signal; and a vehicle component whose operation is necessary to drive said vehicle, said vehicle component being operable to selectively assume two operation states including a vehicle drive state in which said vehicle component allows said vehicle to be used and a vehicle protection state in which said vehicle component protect said vehicle from being used in response to said control signal received by said vehicle communication means and to provide said result signal in response to the operation of said vehicle component, wherein:

said vehicle component comprises an engine, and said vehicle unlocking apparatus comprises an engine operation control apparatus for selectively assuming said vehicle drive state in which said engine operation control apparatus enables the operation of said engine, and said vehicle protection state in which said engine operation control apparatus disables the operation of said engine in response to said control signal received by said vehicle communication means, said vehicle unlocking apparatus further comprises:

an electronic driver license having stored therein an identification information element, said electronic driver license capable of being carried; and a vehicle security control apparatus provided in said vehicle, said vehicle security control apparatus including driver license reading out means for reading out said identification information element stored in said electronic driver license;

said vehicle communication means being constituted by an identification information transmitting unit for transmitting said identification information element read out by said driver license reading out means to said base station, said base station being constituted by a driver license management apparatus having stored therein a plurality of driver information elements respectively corresponding to a plurality of identification information elements, said driver license management apparatus operative to select a driver information element corresponding to said identification information element received from said vehicle security control apparatus from among said driver information elements stored in said driver license management apparatus, and judge whether or not said electronic driver license is valid on the basis of said driver information element corresponding to said identification information element thus selected, and transmit said control signal indicating the result of said judgment, said vehicle security control apparatus further including:

engine operation judging means for judging whether or not the operation of said engine is to be enabled in response to the result of said judgment indicated by said control signal received from said driver license management apparatus, said engine operation judging means being operative to selectively transmit an enable signal indicating that the operation of said engine is to be enabled and a disable signal indicating that the operation of said engine is to be disabled to an engine operation control apparatus on the basis of a result of said judgment, and said engine operation control apparatus being operative to assume said vehicle drive state in which said engine operation control apparatus enables the operation of said engine in response to said enable signal and said vehicle protection state in which said engine operation control apparatus disables the operation of said engine in response to said disable signal, said driver license management apparatus further includes:

message generating means for generating a message to be provided with the holder of said electronic driver license on the basis of said driver information element selected by said driver information selecting means, said control signal transmitting means being operative to transmit said message generated by said message generating means to said vehicle security control apparatus, and said vehicle security control apparatus further includes message providing means for providing said message transmitted by said control signal transmitting means, said vehicle security control apparatus further including acknowledgment generating means for generating an acknowledgment signal in response to user's acknowledgment instruction after said message has been provided, and said engine operation judging means is not operative to transmit an enable signal indicating that the operation of said engine is to be enabled until said acknowledgment signal is received, said vehicle security control apparatus further includes acknowledgment transmitting means for transmitting said acknowledgment signal generated by said acknowledgment generating means to said driver license management apparatus, said result signal including said acknowledgment signal, said driver license management apparatus further including expiration date calculating means for calculating an expiration date on the basis of the date when said acknowledgment signal is received; and said expiration date calculating means is operative to write said expiration date thus calculated into said driver information element stored in said driver information storage means.

33. A vehicle security control apparatus comprising:

a driver license reading out means for reading out an identification information element stored in said electronic driver license;

an identification information transmitting unit for transmitting said identification information element read out by said driver license reading out means to a driver license management apparatus result signaling means for transmitting a result signal to said driver license management system; and an engine operation judging means for judging whether or not the operation of said engine is to be enabled in response to a control signal received from said driver license management apparatus, said engine operation judging means being operative to selectively transmit an enable signal indicating that the operation of said engine is to be enabled and a disable signal indicating that the operation of said engine is to be disabled to an engine operation control apparatus on the basis of a result of said judgment, and;

further comprising: message providing means for providing a message transmitted by said driver license management apparatus, acknowledgment generating means for generating an acknowledgment signal in response to user's acknowledgment instruction after said message has been provided, and in which said engine operation judging means is not operative to transmit an enable signal indicating that the operation of said engine is to be enabled until said acknowledgment signal is received, and;

acknowledgment transmitting means for transmitting said acknowledgment signal generated by said acknowledgment generating means to said driver license management apparatus, said result signal including said acknowledgment signal.

* * * * *